(12) United States Patent
Li et al.

(10) Patent No.: US 10,404,147 B2
(45) Date of Patent: Sep. 3, 2019

(54) STATOR, SINGLE PHASE MOTOR AND FAN

(71) Applicant: JOHNSON ELECTRIC INTERNATIONAL AG, Murten (CH)

(72) Inventors: Min Li, Shenzhen (CN); Kok Ang Chong, Hong Kong (CN); Xiao Lin Zhang, Shenzhen (CN); Hai Yang Wang, Shenzhen (CN); Moola Mallikarjuna Reddy, Shenzhen (CN); Yue Li, Hong Kong (CN); Chui You Zhou, Shenzhen (CN); Hong Liang Yi, Shenzhen (CN); Yong Gang Zhang, Shenzhen (CN); Yong Wang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 165 days.

(21) Appl. No.: 15/471,558

(22) Filed: Mar. 28, 2017

(65) Prior Publication Data

US 2017/0279342 A1  Sep. 28, 2017

(30) Foreign Application Priority Data

Mar. 28, 2016 (CN) .......................... 2016 1 0182560
Mar. 28, 2016 (CN) .......................... 2016 1 0182580
Jun. 27, 2016 (CN) .......................... 2016 1 0482697

(51) Int. Cl.
| | |
|---|---|
| *H02K 1/14* | (2006.01) |
| *H02K 11/00* | (2016.01) |
| *H02K 3/28* | (2006.01) |
| *H02K 11/215* | (2016.01) |
| *H02K 21/14* | (2006.01) |

(Continued)

(52) U.S. Cl.
CPC ............ *H02K 21/14* (2013.01); *F04D 25/06* (2013.01); *F04D 25/08* (2013.01); *H02K 1/141* (2013.01); *H02K 1/2706* (2013.01); *H02K 3/28* (2013.01); *H02K 11/215* (2016.01); *H02K 11/25* (2016.01)

(58) Field of Classification Search
CPC ........ H02K 1/143; H02K 19/04; H02K 21/18; H02K 21/185; H02K 11/00; F04B 17/03; F04D 13/06
USPC ......... 310/68 C, DIG. 3, DIG. 6, 68 R, 68 B, 310/194
See application file for complete search history.

(56) References Cited

U.S. PATENT DOCUMENTS 2,355,175 A * 8/1944 Olving ................... H02K 7/145
                                                              310/172
4,112,405 A * 9/1978 Joseph .................. H01F 27/402
                                                              310/68 C (Continued)

FOREIGN PATENT DOCUMENTS

| EP | 1601080 A1 * | 11/2005 | ............. H02K 1/143 |
| JP | 2001224155 * | 8/2001 | ............. H02K 29/00 |

(Continued)

*Primary Examiner* — Burton S Mullins
(74) *Attorney, Agent, or Firm* — Muncy, Geissler, Olds & Lowe, P.C.

(57) ABSTRACT

A stator includes a stator core including stator poles and a yoke connecting the stator poles, at least one winding wound around the stator core and connecting terminals configured to connect with an external power source to supply power to the winding and located at one end of the yoke adjacent the stator poles. A single phase motor and a ventilation fan are also provided.

16 Claims, 21 Drawing Sheets

(51) Int. Cl.
  *H02K 11/25* (2016.01)
  *H02K 1/27* (2006.01)
  *F04D 25/08* (2006.01)
  *F04D 25/06* (2006.01)

(56) References Cited

U.S. PATENT DOCUMENTS

| | | | | |
|---|---|---|---|---|
| 4,251,911 A * | 2/1981 | Reynolds | | H01F 41/10 29/418 |
| 4,855,629 A * | 8/1989 | Sato | | H02K 21/14 310/49.33 |
| 6,046,522 A * | 4/2000 | Ko | | H02K 7/1185 192/45.005 |
| 6,069,428 A * | 5/2000 | Nelson | | H02K 5/15 310/401 |
| 6,809,452 B2 * | 10/2004 | Cho | | H02K 1/143 310/216.001 |
| 6,977,455 B2 * | 12/2005 | Marioni | | H02K 1/148 310/194 |
| 6,982,532 B2 * | 1/2006 | Mullin | | H02K 3/524 318/293 |
| 7,038,570 B2 * | 5/2006 | McMichael | | H01F 27/402 310/68 C |
| 7,638,911 B2 * | 12/2009 | Lee | | H02K 1/148 310/89 |
| 7,719,155 B2 * | 5/2010 | Marioni | | H02K 1/148 310/216.001 |
| 7,911,109 B2 * | 3/2011 | Marioni | | H02K 1/143 310/216.091 |
| 8,125,112 B2 * | 2/2012 | Qin | | H02K 23/30 310/194 |
| 8,350,425 B2 * | 1/2013 | Green | | G01D 11/30 310/68 B |
| 8,519,589 B2 * | 8/2013 | Sasaki | | F04B 35/04 310/172 |
| 8,624,451 B2 * | 1/2014 | Shi | | H02K 5/08 29/596 |
| 2010/0311318 A1 * | 12/2010 | Hause | | F04D 27/004 454/256 |
| 2013/0181556 A1 * | 7/2013 | Li | | H02K 3/522 310/71 |
| 2014/0132110 A1 * | 5/2014 | Burton | | H02K 1/18 310/216.131 |
| 2015/0130306 A1 * | 5/2015 | Kitamura | | H02K 9/06 310/63 |

FOREIGN PATENT DOCUMENTS

| | | | | | |
|---|---|---|---|---|---|
| JP | 2001224156 A | * | 8/2001 | | H02K 29/08 |
| JP | 3239120 B2 | * | 12/2001 | | H02K 29/00 |
| JP | 2010007902 | * | 1/2010 | | F24F 1/143 |
| JP | 2015142497 | * | 8/2015 | | H02K 21/18 |
| KR | 20030055006 A | * | 7/2003 | | H02K 1/06 |

* cited by examiner

STATOR, SINGLE PHASE MOTOR AND FAN

CROSS REFERENCE TO RELATED APPLICATIONS

This non-provisional patent application claims priorities under 35 U.S.C. § 119(a) from Patent Application No. 201610182560.2 and Patent Application No. 201610182580.X both filed in The People's Republic of China on 28 Mar. 2016 and Patent Application No. 201610482697.X filed in The People's Republic of China on 27 Jun. 2016.

FIELD OF THE INVENTION

This invention relates to a stator structure of a motor.

BACKGROUND OF THE INVENTION

Permanent magnet synchronous motors are typically used in drain pumps and circulating pumps for dishwashers or washing machines. Stator of the motor usually includes a U-shaped stator core and a winding bracket having two brackets arranged in parallel with each other and respectively sleeved on two branches of the U-shaped stator core. Conventionally, such a motor is connected with an external power source through two connecting terminals which are arranged at one end of the winding bracket away from the rotor of the motor.

SUMMARY OF THE INVENTION

In one aspect, a stator is provided which includes a stator core including stator poles and a yoke connecting the stator poles, at least one winding wound around the stator core and connecting terminals configured to connect with an external power source to supply power to the winding and located at one end of the yoke adjacent the stator poles.

Preferably, the stator further includes a winding bracket between the stator core and the winding, the connecting terminals being fixed to the winding bracket.

Preferably, the number of the stator poles is two, the yoke is in a U-shaped form and the winding bracket comprises a first bracket and a second bracket arranged in parallel with each other, the first bracket or the second bracket having a winding portion and an inserting portion disposed at one end of the winding portion, the connecting terminals being disposed on the inserting portion.

Preferably, the stator further includes an electronic circuit and a connecting member disposed on the winding bracket, the connecting member being separately formed and electrically connected the winding with the electronic circuit.

Preferably, the number of the connecting terminals is two, the electronic circuit and the winding are in series connected between the two connecting terminals, one of the two connecting terminals being electrically connected with the electronic circuit and both ends of the winding being electrically connected with the connecting member and the other one of the two connecting terminals respectively.

Preferably, the connecting member, the connecting terminals and the electronic circuit are all disposed on the winding bracket and located at one end of the yoke adjacent the stator pole.

Preferably, the electronic circuit comprises a magnetic sensor disposed adjacent the connecting terminals and between the connecting terminals and the connecting member.

In another aspect, a stator includes a stator core including stator poles and a yoke connecting the stator poles, at least one winding wound around the stator core, a winding bracket arranged between the stator core and the winding, at least one support portion arranged at one end of the winding bracket adjacent the stator poles, and a circuit board fixed to the winding bracket and supported by the at least one support portion.

Preferably, the number of the stator poles is two and the yoke is in a U-shaped form.

Preferably, the winding bracket supports the circuit board only at one end adjacent the two stator poles.

Preferably, the stator further includes a connecting member electrically connecting the winding with the circuit board, the connecting member being separately formed and soldered to the circuit board.

Preferably, the stator further includes a first connecting terminal which includes a body, a connecting end for connecting to a power source, a connecting portion electrically connected with the circuit board, the body, the connecting end and the connecting portion of the first connecting terminal being all integrally formed.

Preferably, the stator further includes a second connecting terminal which includes a body, a connecting end for connecting to the power source and a wire-connecting portion electrically connected with the winding, the body, the connecting end and the wire-connecting portion of the second connecting terminal being all integrally formed.

Preferably, the circuit board has no overlap with the end of the winding bracket away from the stator poles.

Preferably, the circuit board includes a magnetic sensor, the magnetic sensor and the winding being located at two sides of the support portion respectively.

Preferably, the circuit board is supported only at one side adjacent the stator poles.

In still another aspect, a single phase motor includes a rotor and a stator magnetically coupled to the rotor, the stator includes a stator core, an insulating bracket mounted to the stator core, a winding wound around the insulating bracket and a circuit board mounted to the insulating bracket adjacent the winding.

Preferably, the rotor comprises a rotary shaft, one end of the rotary shaft protrudes out of the rotor and stator, and the circuit board is mounted to one side of the insulating bracket away from a protruding direction of the rotary shaft.

In still another aspect, a ventilation fan is provided which includes an impeller. The ventilation fan further includes the above single phase motor. The impeller is mounted to a rotary shaft of the single phase motor to be driven by the rotary shaft.

Preferably, the circuit board is mounted to one side of the insulating bracket opposite from the impeller and is adjacent the winding, and an airflow generated by the impeller flows over and cool the circuit board.

Preferably, the impeller has an outer diameter greater than a size of the single phase motor, and the circuit board and the winding are located within a flow passage of the airflow generated by the impeller.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "connected" to another component, it can be directly connected to said another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
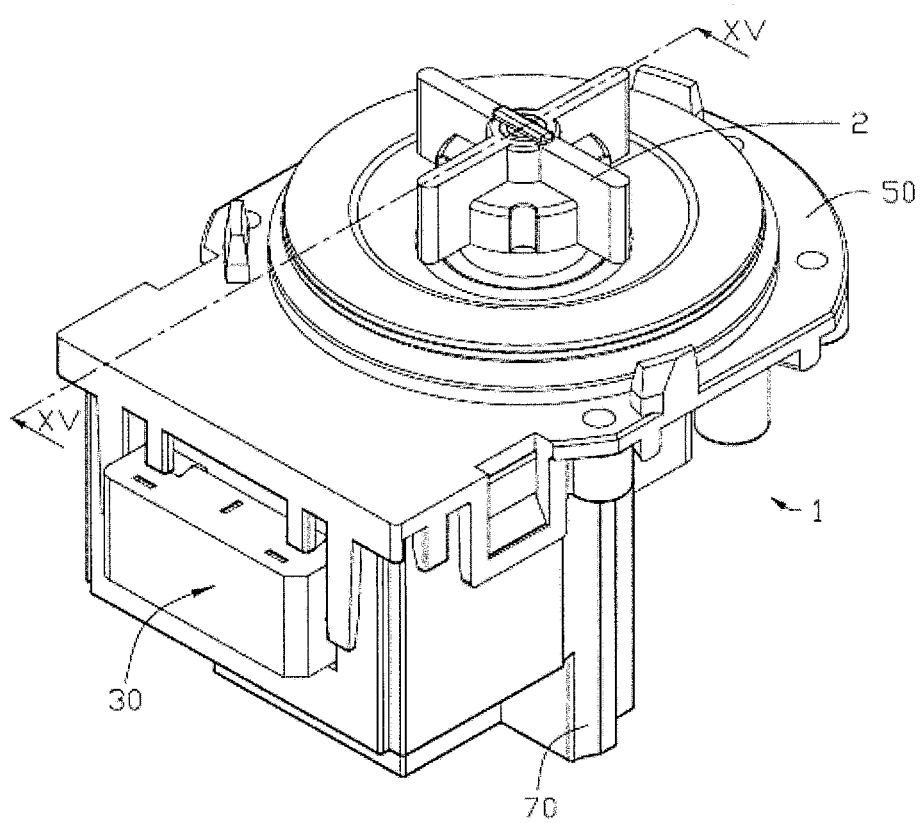
FIG. 1 is a perspective view of a motor according to one embodiment of the present invention.
Figure 2:
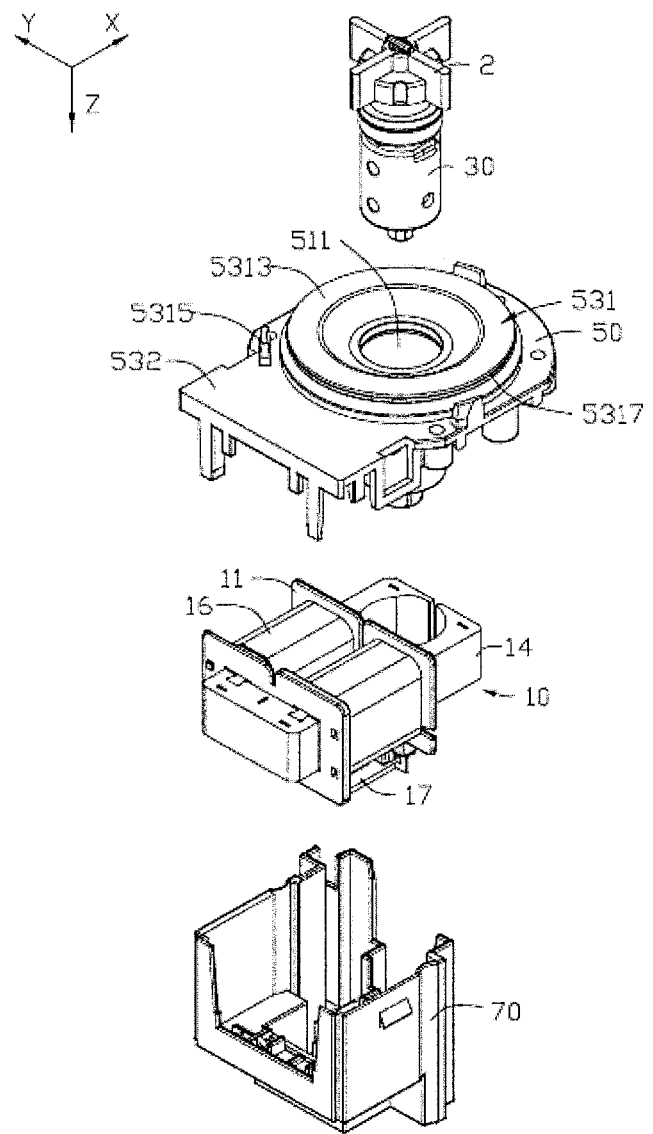
FIG. 2 is a perspective, exploded view of the motor of FIG. 1.
Figure 3:
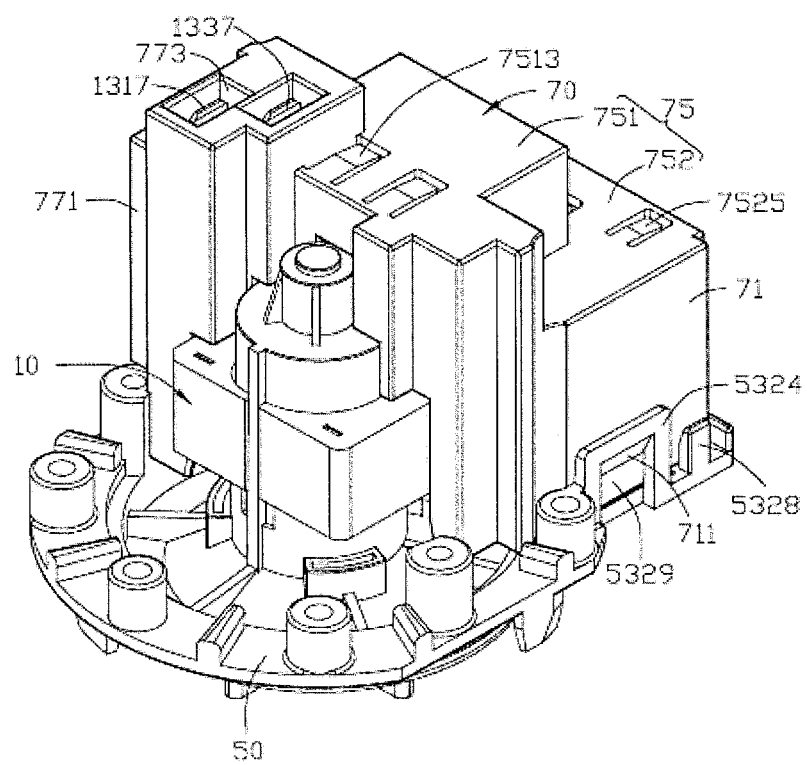
FIG. 3 is a perspective view of the motor of FIG. 1, viewed from another aspect.
Figure 4:
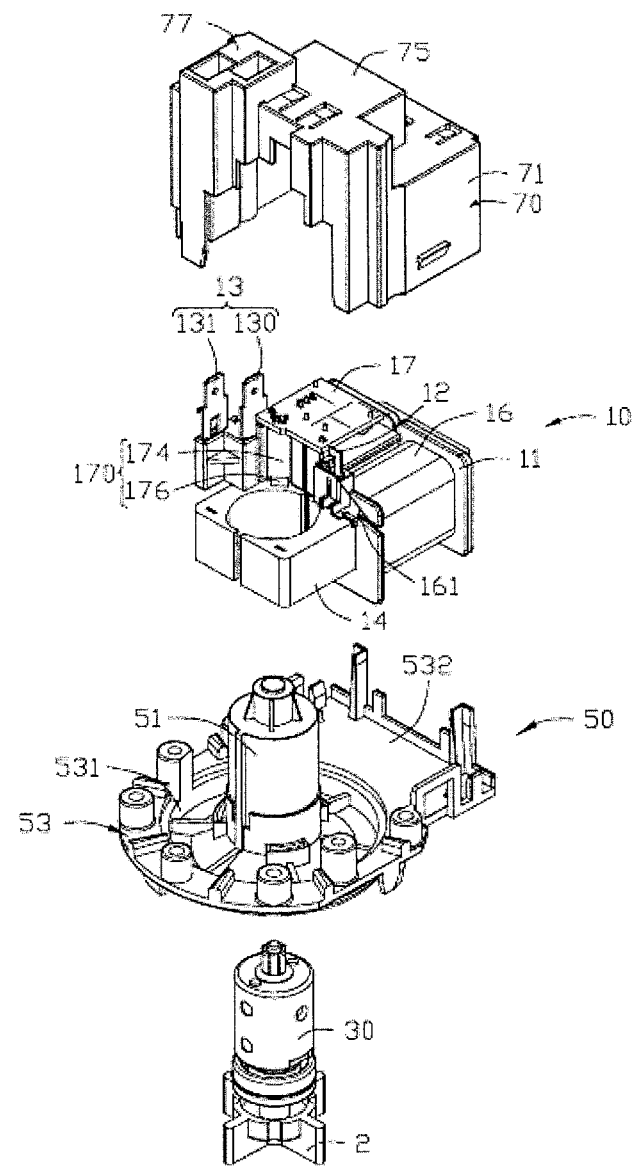
FIG. 4 is a perspective, exploded view of the motor of FIG. 3.
Figure 5:
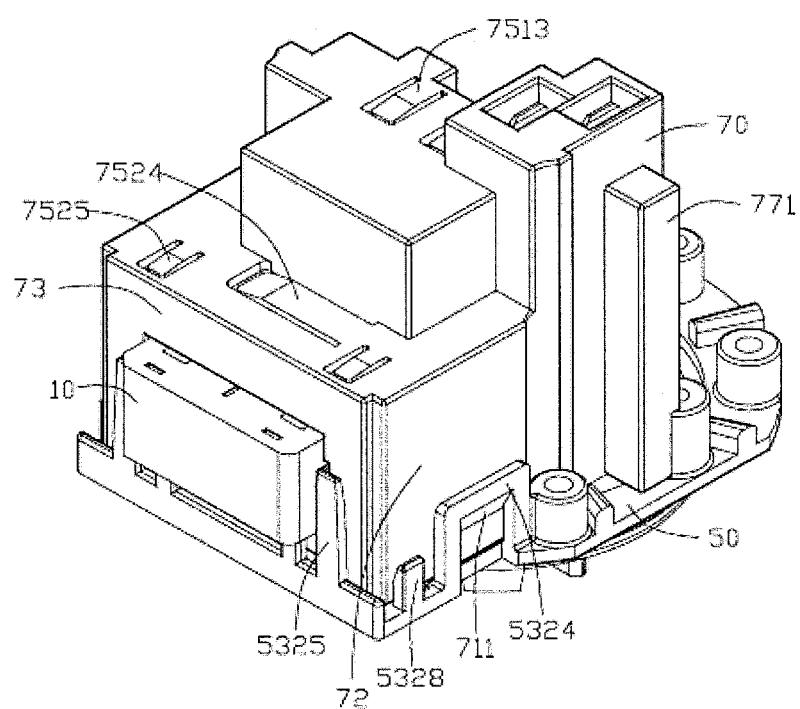
FIG. 5 is a perspective view of the motor of FIG. 1, viewed from still another aspect.
Figure 6:
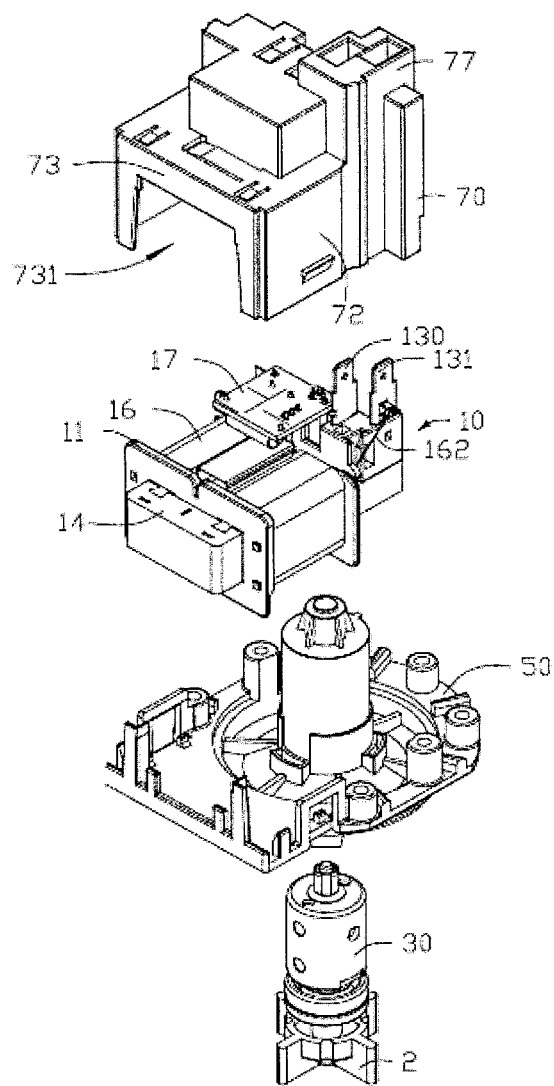
FIG. 6 is a perspective, exploded view of the motor of FIG. 5.
Figure 7:
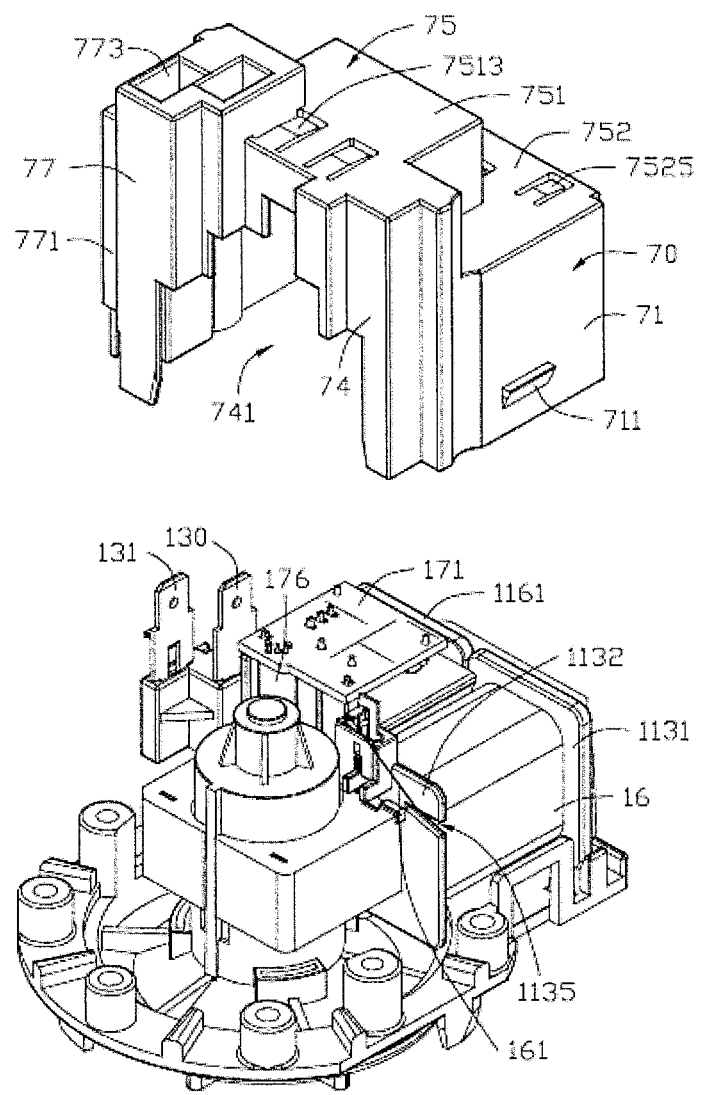
FIG. 7 is a partially exploded view of the motor of FIG. 1.
Figure 8:
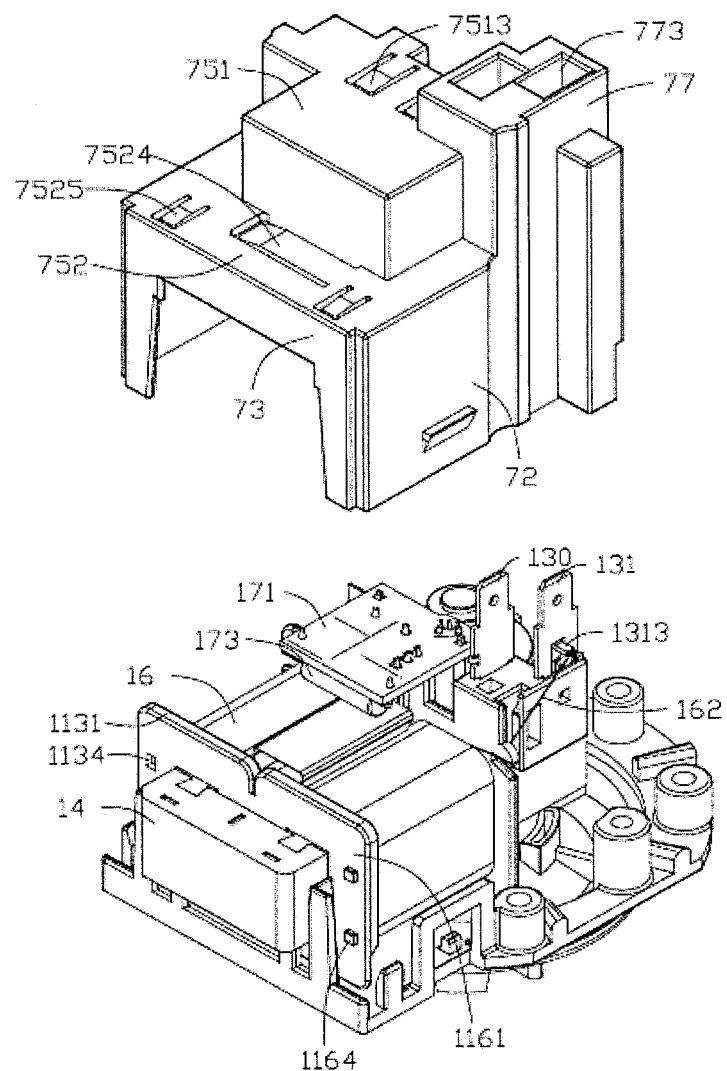
FIG. 8 is a partially exploded view of the motor of FIG. 7, viewed from another aspect.
Figure 9:
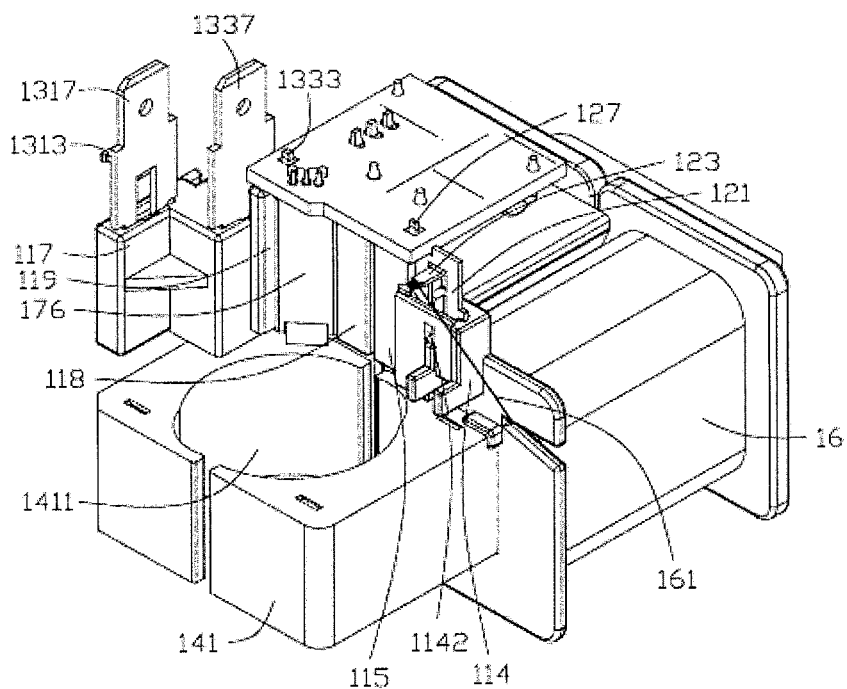
FIG. 9 is a perspective view of the stator of the motor of FIG. 1.
Figure 10:
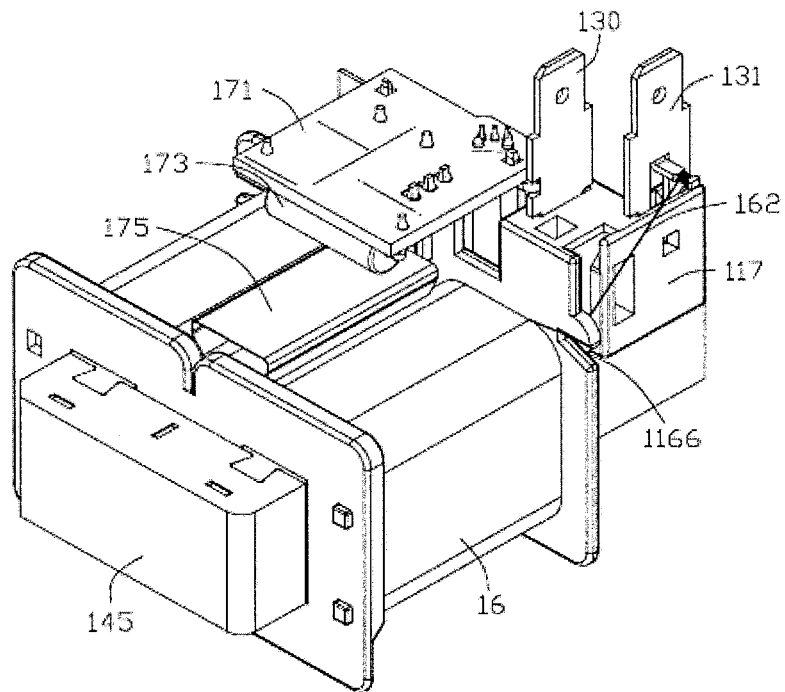
FIG. 10 is a perspective view of the stator of the motor of FIG. 9, viewed from another aspect.
Figure 11:
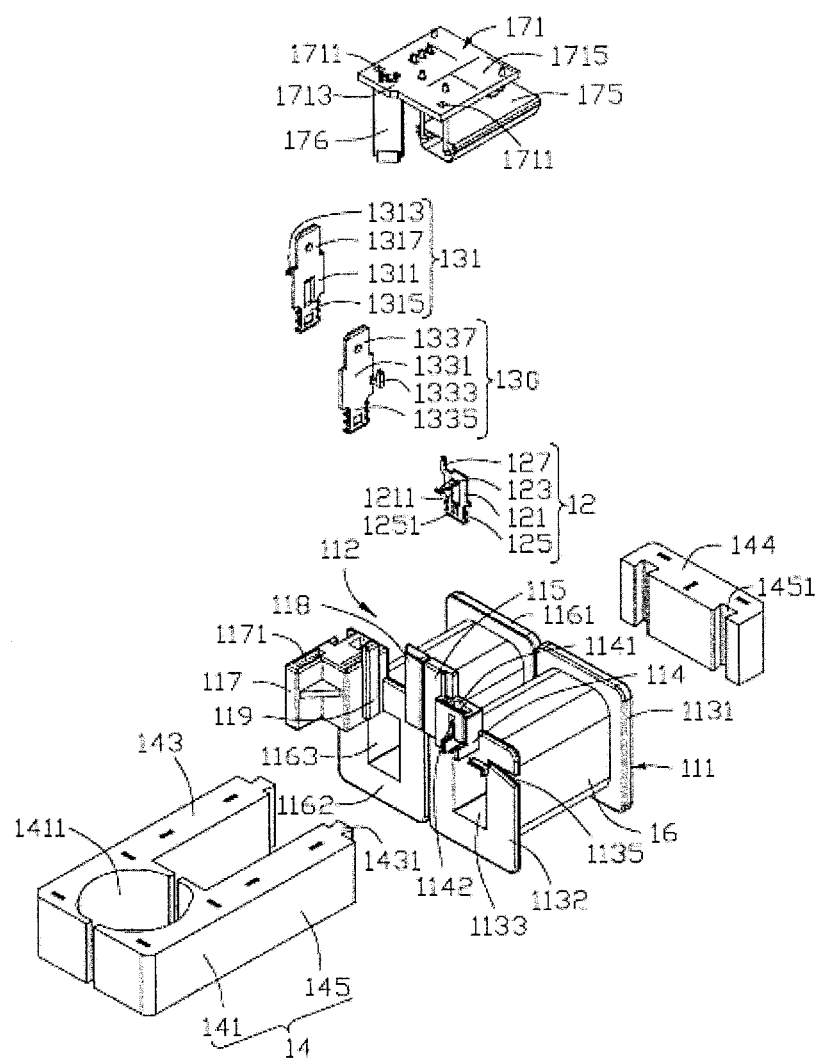
FIG. 11 is a perspective, exploded view of the stator of FIG. 9.
Figure 12:
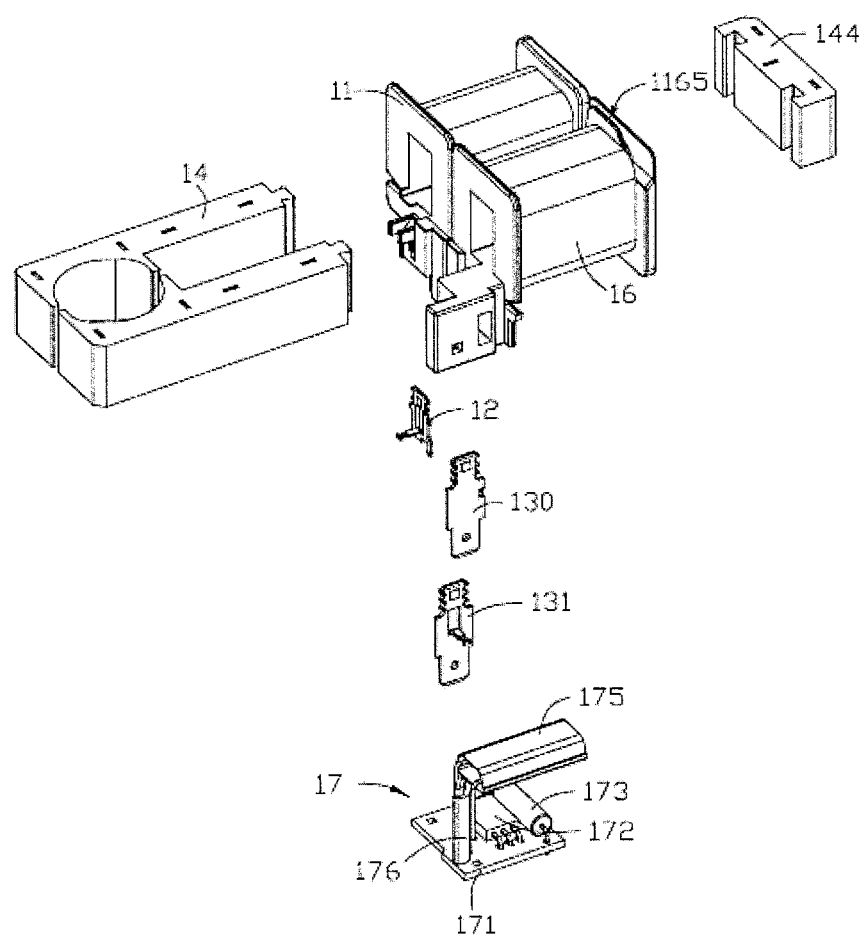
FIG. 12 is a perspective, exploded view of the stator of FIG. 11, viewed from another aspect.

Referring to FIG. 1, a motor 1 in accordance with one embodiment of the present invention is configured to drive an external device to rotate or drive an external device to translate through a transmission device. The external device may be a device that operates under electric power (such as a communication device or an electric device) or a device that operates without electric power supply (such as a vehicle window). In this embodiment, the motor 1 is configured to drive an impeller 2 which may be used in a product such as a washing machine, a dishwasher, or a water pump. The motor 1 of this embodiment may be an inner-rotor single-phase motor. In another embodiment, the motor 1 may be of another type, such as an outer-rotor motor or a single-phase permanent motor.

Referring to FIG. 1 to FIG. 6, the motor 1 includes a stator 10, a rotor 30, a base body 50 covering the rotor 30, and a protective cover 70 snap-fitted with the base body 50. The rotor 30 and the base body 50 covering the rotor 30 together pass through part of the stator 10, and the protective cover 70 covers at least part of the stator 10.

The stator 10 includes a winding bracket 11, a connecting member 12, two connecting terminals 13, a stator core 14, a winding 16, and an electronic circuit. The connecting member 12 and the connecting terminals 13 are disposed on the winding bracket 11, and the winding bracket 11 is mounted on the stator core 14. The winding 16 is wound around the winding bracket 11. Two wire ends of the winding 16 are connected with the connecting member 12 and one (a first connecting terminal 130) of the two connecting terminals 13, respectively, by for example soldering, lapping connection, wrapping connection or indirect connection. The electronic circuit is disposed on the winding bracket 11 and is connected with the connecting member 12 and the other (a second connecting terminal 131) of the two connecting terminals 13, respectively. Preferably, the two connecting terminals are used to connect with a power supply. In this embodiment, the electronic circuit includes a circuit board 17. In this embodiment, the winding 16 is a single phase winding.

The winding bracket 11 is made from an insulation material and, in this embodiment, the winding bracket 11 is a plastic member. In another embodiment, the winding bracket 11 may be made from another insulation material.

The winding bracket 11 includes a first bracket 11 and a second bracket 112 connected rotatably relative to each other. The first bracket 111 includes a first winding portion 113, and a first inserting portion 114 and a first supporting portion 115 disposed on the first winding portion 113. The second bracket 112 includes a second winding portion 116 in parallel with the first winding portion 113, a second inserting portion 117 disposed on the second winding portion 116, a second supporting portion 118 disposed on the second winding portion 116, and a third supporting portion 119 disposed on the second inserting portion 117. The first winding portion 113 and the second winding portion 116 are connected rotatably relative to each other. The first supporting portion 115, the second supporting portion 118 and the third supporting portion 119 have the same height but are not positioned on the same straight line, i.e. the first supporting portion 115, the second supporting portion 118 and the third supporting portion 119 are able to form a supporting plane for supporting the circuit board 17. In this embodiment, the first supporting portion 115 and the second supporting portion 118 are arranged in parallel, and the third supporting portion 119 is perpendicular to the first supporting portion 115 and the second supporting portion 118.

Referring also to FIG. 7 to FIG. 12, the first winding portion 113 is generally in the shape of "I", including a winding column 1130 extending in a first direction (assuming in the X-axis direction), and a first insulation plate 1131 and a second insulation plate 1132 respectively disposed at two ends of the winding column 1130. The first insulation plate 1131 and the second insulation plate 1132 are generally parallel to each other and both perpendicular to the winding column 1130, i.e. the first insulation plate 1131 and the second insulation plate 1132 are both parallel to a YZ plane, where the Y-axis extends in a second direction, the Z-axis extends in a third direction, and the first direction, the second direction and the third direction are perpendicular to one another. The first winding portion 113 defines a first through hole 1133 along the X-axis direction through the first insulation plate 1131, the winding column 1130 and the second insulation plate 1132. In this embodiment, the three directions are introduced for ease of understanding the structural relationship of the elements of the winding portion. It should be understandable that these elements are not limited to be arranged in these directions.

An end face of the first insulation plate 1131 opposite from the second insulation plate 1132 is provided with two first snap-fit portions 1134. In this embodiment, the first snap-fit portions 1134 are locking slots. In other embodiments, the first snap-fit portions 1134 may be other snap-fit structures such as protrusions, hooks or the like. The second insulation plate 1132 defines a wire-clamping groove 1135. In this embodiment, the wire-clamping groove 1135 is generally V-shaped, and passes through two end faces perpendicular to the X-axis and a side face opposite from the second bracket 112. A projection protrudes from an end face of the second insulation plate 1132 opposite from the winding column 1130. The projection is generally in the shape of " ᄀ " and is disposed at an edge of the first through hole 1133.

The first inserting portion 114 is disposed on the second insulation plate 1132, adjacent the wire-clamping groove 1135 and the projection. In this embodiment, the first inserting portion 114 and the second insulation plate 1132 are integrally formed. In other embodiments, the first inserting portion 114 may be mounted or assembled to the second insulation plate 1132.

The first inserting portion 114 defines a first receiving slot 1141 for receiving the connecting member 12. The first receiving slot 1141 is formed by recessing a face of the first inserting portion 114 that is parallel to an XY plane in a direction perpendicular to the X-axis and parallel to the second insulation plate 1132 (i.e. in the Z-axis direction). In this embodiment, the first receiving slot 1141 is generally in the shape of "凸".

A face (parallel to the YZ plane) of the first inserting portion 114 opposite from the winding column 1130 defines a groove 1142 in communication with the first receiving slot 1141.

In this embodiment, the first supporting portion 115, the first inserting portion 114 and the second insulation plate 1132 are all integrally formed. In other embodiments, the first supporting portion 115 may be integrally formed with or connected to only one of the first inserting portion 114 and the second insulation plate 1132. The first supporting portion 115 is generally bar-shaped, which has a height in the Z-axis direction greater than that of the first inserting portion 114. An edge of the first supporting portion 115 away from the first inserting portion 114 is generally flush with an edge of the second insulation plate 1132. In other embodiments, however, the edges of the first supporting portion 115 and the second insulation plate 1132 may not be flush with each other as long as arrangement of other parts is not affected. In this embodiment, the edge of the first supporting portion 115 is flush with the edge of the second insulation plate 1132. A corner portion of the first supporting portion 115 further forms a guiding groove 1151 extending along the Z-axis direction.

The second winding portion 116 has a shape similar to that of the first winding portion 113. The second winding portion 116 is generally in the shape of "I", including a winding column 1160 extending in the X-axis direction, and a third insulation plate 1161 and a fourth insulation plate 1162 respectively disposed at two ends of the winding column 1160. The third insulation plate 1161 and the fourth insulation plate 1162 are generally parallel to each other and both perpendicular to the winding column 1160, i.e. the third insulation plate 1161 and the fourth insulation plate 1162 are both parallel to a YZ plane, the third insulation plate 1161 and the first insulation plate 1131 are located on the same plane, and the fourth insulation plate 1162 and the second insulation plate 1132 are located on the same plane. The second winding portion 116 defines a second through hole 1163 along the X-axis direction through the third insulation plate 1161, the winding column 1160 and the fourth insulation plate 1162.

Figure 13:
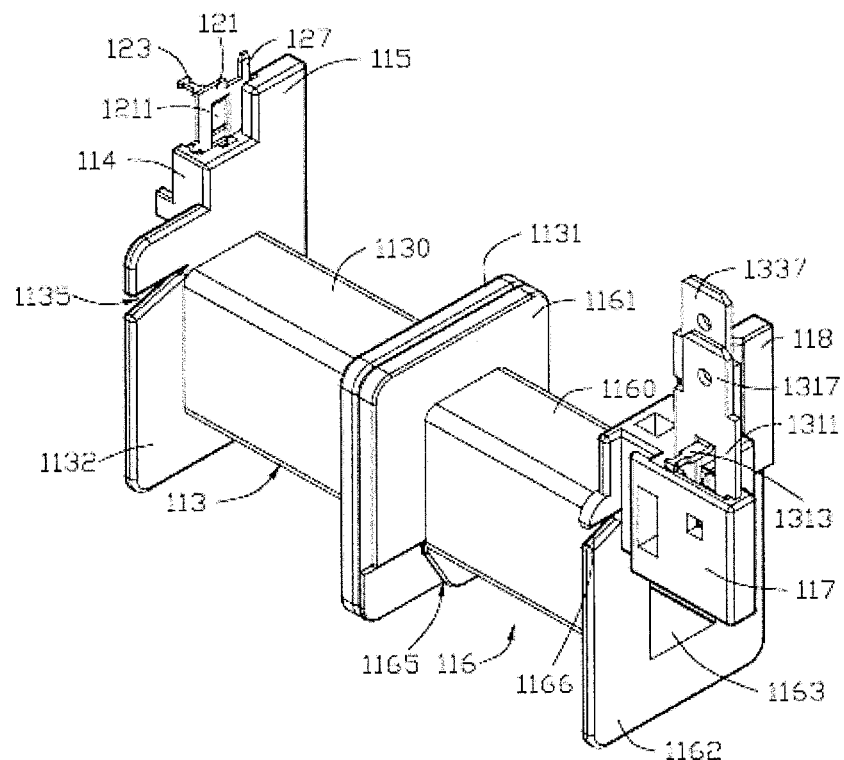
FIG. 13 illustrates a winding bracket of the stator of FIG. 9 during the winding process.

Referring also to FIG. 13, an edge of the third insulation plate 1161 is rotatably connected with an edge of the first insulation plate 1131. In this embodiment, the edge of the third insulation plate 1161 is integrally formed with the edge of the first insulation plate 1131, and a material thickness at a connection area is less than a material thickness of the third insulation plate 1161 or the first insulation plate 1131, such that the third insulation plate 1161 and the first insulation plate 1131 are capable of rotating relatively to a position where the third insulation plate 1161 is parallel to and stacked with the first insulation plate 1131.

An end face of the third insulation plate 1161 opposite from the fourth insulation plate 1162 is provided with two second snap-fit portions 1164. In this embodiment, the second snap-fit portions 1164 are protrusions. In other embodiments, the second snap-fit portions 1164 may be other snap-fit structures for engagement with the first snap-fit portions 1134, such as slots, hooks or the like. When the third insulation plate 1161 and the first insulation plate 1131 rotate relatively to the position where the third insulation plate 1161 and the first insulation plate 1131 are parallel to and stacked with each other, the two second snap-fit portions 1164 engage with two first snap-fit portions 1134 to prevent backward movements of the third insulation plate 1161 and the first insulation plate 1131 under restoring forces, thereby ensuring that the third insulation plate 1161 and the first insulation plate 1131 are arranged on the same straight line and hence facilitating the winding. The third insulation plate 1161 further defines a wire-guiding groove 1165 in a side thereof adjacent the first insulation plate 1131, for facilitating the winding.

The fourth insulation plate 1162 defines a wire-clamping groove 1166. In this embodiment, the wire-connecting groove 1166 is generally V-shaped, and passes through two end faces perpendicular to the X-axis and a side face opposite from the first bracket 111.

The second inserting portion 117 is disposed on the fourth insulation plate 1162 adjacent the wire-clamping groove

1166. In this embodiment, the second inserting portion 117 and the fourth insulation plate 1162 are integrally formed. In other embodiments, the second inserting portion 117 may be mounted or assembled to the fourth insulation plate 1162.

The second inserting portion 117 defines two second receiving slots 1171 for receiving two connecting terminals 13. The second receiving slot 1171 has a shape similar to that of the first receiving slot 1141. The two second receiving slots 1171 are generally parallel to each other but are arranged offset from each other.

In this embodiment, the second supporting portion 118 and the fourth insulation plate 1162 are integrally formed. The second supporting portion 118 is generally bar-shaped, which is arranged in parallel with the first supporting portion 115. The second supporting portion 118 has a height in the Z-axis direction equal to that of the first supporting portion 115. An edge of the second supporting portion 118 away from the second inserting portion 117 is generally flush with an edge of the fourth insulation plate 1162. In other embodiments, however, the edges of the second supporting portion 118 and the fourth insulation plate 1162 may not be flush with each other as long as arrangement of other parts is not affected. In this embodiment, the edge of the second supporting portion 118 is flush with the edge of the fourth insulation plate 1162.

In this embodiment, the third supporting portion 119 is integrally formed with the second inserting portion 117, extends along the Z-axis direction, and is located on a face (parallel to the XZ plane) of the second inserting portion 117 adjacent the second supporting portion 118. In this embodiment, the third supporting portion 119 has a height in the Z-axis direction equal to that of the second supporting portion 118. In other embodiments, the third supporting portion 119 may also be disposed on the fourth insulation plate 1162.

In another embodiment, the first supporting portion 115, the second supporting portion 118 and the third supporting portion 119 may be omitted, or only one or two of the first supporting portion 115, the second supporting portion 118 and the third supporting portion 119 are formed. In the embodiment that the first supporting portion 115, the second supporting portion 118 and the third supporting portion 119 are omitted, the circuit board 17 is supported only by the connecting member 12 and the first connecting terminal 130.

In another embodiment, the winding may have a structure different from those described herein, and the circuit board 17 may be supported on the winding bracket by other means.

In another embodiment, the first insulation plate 1131 and the third insulation plate 1161 may be disconnected from each other, and the first bracket 111 and the second bracket 112 may be two separate parts. During the winding process, the first bracket 111 and the second bracket 112 are connected end-to-end.

It should be understood that it is not intended to limit the structure of the winding bracket 11 of other embodiments to those described above. In addition, for facilitating the understanding of the structure and orientations of the winding bracket 11, the integrally formed winding bracket 11 is divided into parts, such as the inserting portions, supporting portions, in the above description. In other embodiments, the winding bracket 11 may not have these structures.

The connecting member 12 is made from a conductive material, which is inserted into the first receiving slot 1141 and used to electrically connect the circuit board 17 with the winding 16. The connecting member 12 is separately formed and then soldered to the circuit board 17. In this embodiment, the connecting member 12 is generally sheet-shaped. The connecting member 12 includes a body 121, a wire-connecting portion 123 bent from the body 121, a fixing portion 125 connected with one end of the body 121, a connecting portion 127 connected with another end of the body 121. The body 121, the wire-connecting portion 123, the fixing portion 125, and the connecting portion 127 are integrally formed. The body 121 defines an opening 1211, and the wire-connecting portion 123 is disposed adjacent an edge of the opening 1211. In this embodiment, the wire-connecting portion 123 is formed by bending a portion cut from the body 121. In another embodiment, the wire-connecting portion 123 may be formed by stamping the body 121 or, alternatively, the wire-connecting portion 123 may be formed as a separate part that is assembled to the body 121.

The fixing portion 125 is configured for insertion into the first receiving slot 1141 to fix the connecting member 12 to the first inserting portion 114. Teeth are formed on both of two sides of the fixing portion 125 to enhance the fixing effect. A protrusion 1251 further protrudes from the fixing portion 125 to further enhance the connecting strength of the fixing portion 125 in the first receiving slot 1141. The protrusion 1251 is formed with a beveled surface for facilitating inserting the connecting member 12 into and removing the connecting member 12 from the first receiving slot 1141, and the protrusion 1251 is snap-fitted in the groove 1142. The connecting portion 127 and the body 121 are located on the same plane and are generally perpendicular to the wire-connecting portion 123. In this embodiment, the connecting portion 127 is formed by cutting the body 121. In another embodiment, the connecting portion 127 may also be a separate part assembled to the body 121. In this embodiment, the connecting member 12 is disposed on the first inserting portion 114 along the YZ plane, and the wire-connecting portion 123 is disposed along the X-axis direction. In other embodiments, the connecting member 12 may have any suitable orientation.

The two connecting terminals 13 (i.e. the first connecting terminal 130 and the second connecting terminal 131) are inserted in the two second inserting portion 117, respectively. The two connecting terminals 13 act as power supply terminals. In this embodiment, each of the two connecting terminals 13 is separately formed.

The second connecting terminal 131 includes a body 1311, a wire-connecting portion 1313 bent from the body 1311, a fixing portion 1315 connected with one end of the body 1311, and a connecting end 1317 connected with another end of the body 1311. The connecting end 1317 is configured for connecting with a power supply. The body 1311 defines an opening, and the wire-connecting portion 1313 is disposed adjacent an edge of the opening. In this embodiment, the wire-connecting portion 1313 is formed by bending a portion cut from the body 1311. In another embodiment, the wire-connecting portion 1313 may be formed by stamping the body 1311 or, alternatively, the wire-connecting portion 1313 may be formed as a separate part that is assembled to the body 1311.

The fixing portion 1315 is configured for insertion into one of the second receiving slots 1171 to fix the second connecting terminal 131 to the second inserting portion 117. Teeth are formed on both of two sides of the fixing portion 1315 to enhance the fixing effect. A protrusion further protrudes from the fixing portion 1315 to further enhance the connecting strength of the fixing portion 1315 in the second receiving slot 1171. The protrusion is formed with a beveled surface for facilitating inserting the second connecting terminal 131 into and removing the second connecting terminal 131 from the second receiving slot 1171. The connecting end 1317 and the body 1311 are located on the same plane and are generally perpendicular to the wire-connecting portion 1313. In this embodiment, the connecting portion 1317, the body 1311, and the wire-connecting portion 1313 are integrally formed. In another embodiment, the connecting end 1317 may also be a separate part assembled to the body 1311. In this embodiment, the second connecting terminal 131 is disposed on the second inserting portion 117 along the XZ plane, and the wire-connecting portion 1313 is disposed along the Y-axis direction. In other embodiments, the second connecting terminal 131 may have any suitable orientation.

The first connecting terminal 130 includes a body 1331, a connecting portion 1333 bent from the body 1331, a fixing portion 1335 connected with one end of the body 1331, and a connecting end 1337 connected with another end of the body 1331. The connecting portion 1333 fixes and is electrically connected to the circuit board 17, and the connecting end 1337 is configured for connecting with a power supply. In this embodiment, the connecting portion 1333 is generally in the shape of " ⌐ ", which is bent from an edge of the body 1331. The fixing portion 1335 is configured for insertion into the other of the second receiving slots 1171 to position the first connecting terminal 130 to the second inserting portion 117. Teeth are formed on both of two sides of the fixing portion 1335 to enhance the fixing effect. A protrusion further protrudes from the fixing portion 1335 to further enhance the connecting strength of the fixing portion 1335 in the second receiving slot 1171. The protrusion is formed with a beveled surface for facilitating inserting the first connecting terminal 130 into and removing the first connecting terminal 130 from the second receiving slot 1171. The connecting end 1337 and the body 1331 are disposed on the same plane, and the connecting end 1337 is arranged in parallel with and spaced from the connecting end 1317 of the second connecting terminal 131.

In another embodiment, the two connecting terminals 13 may be disposed at the other end of the winding bracket 11.

The stator core 14 includes a pair of opposing stator poles 141 and a U-shaped yoke 145 connecting the pair of stator poles 141. The yoke 145 includes a pair of yoke branches 143 respectively connected with the pair of stator poles 141, and a connecting portion 144 connecting the pair of yoke branches 143. The first bracket 111 and the second bracket 112 are attached around the two yoke branches 143, respectively. Each stator pole 141 includes an arc pole face that concaves inwardly, and the two stator poles 141 cooperatively define a passage 1411 having a generally circular cross-section, for allowing the rotor 30 to pass therethrough. The yoke branches 143 are each generally elongated and arranged generally in parallel with each other. In this embodiment, the two yoke branches 143 extend in the X-axis direction. Each yoke branch 143 and one associated stator pole 141 are integrally formed by stacking a plurality of laminations. A protrusion 1431 protrudes from an end portion of each yoke branch 143 opposite from the stator pole 141. The connecting portion 144 is formed by stacking a plurality of laminations. The connecting portion 144 defines two spaced latching grooves 1451. The protrusions 1431 of the two yoke branches 143 are detachably latched in the latching grooves 1451, respectively. In this embodiment, the latching grooves 1451 are dovetail grooves. In this embodiment, the three supporting portions are all disposed at one end of the winding bracket 11 adjacent the stator poles 141, and the circuit board 17 is supported by the three supporting portions.

The electronic circuit and the winding 16 are connected in series between the first connecting terminal 130 and the second connecting terminal 131, and the winding 16 and the electronic circuit are indirectly electrically connected. The winding 16 is wound around the winding column 1130 and the winding column 1160. In this embodiment, the winding 16 is wound using a single wire with a first wire end 161 and a second wire end 162. The first wire end 161 is wound around and soldered to the wire-connecting portion 123 of the connecting member 12, and the second wire end 162 is wound around and soldered to the wire-connecting portion 1313 of the second connecting terminal 131. In making the winding 16, the first wire end 161 is first wound around the wire-connecting portion 123, and the wire is then wound around the winding column 1130. After the winding around the winding column 1130 is completed, the wire is pulled through the wire-guiding groove 1165 of the third insulation plate 1161. The wire passing through the wire-guiding groove 1165 is continuously wound around the winding column 1160, and then the second wire end 162 is wound around the wire-connecting portion 1313, with the excessive wire being cut off. Finally, the first wire end 161 is soldered to the wire-connecting portion 123, and the second wire-connecting end 162 is soldered to the wire-connecting portion 1313.

Figure 14:
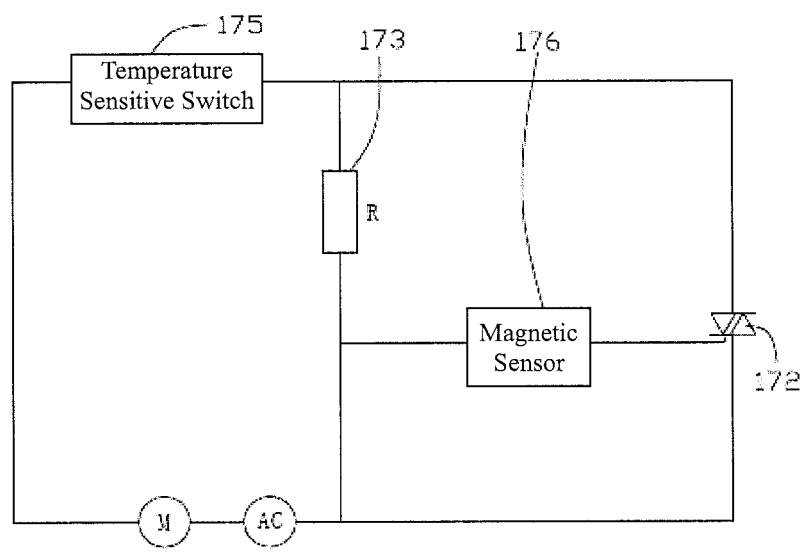
FIG. 14 is a circuit diagram of the motor of FIG. 1.

In this embodiment, only one side of the circuit board 17 adjacent the stator poles 141 is supported by one end of the winding bracket 11 adjacent the stator poles 141, and the circuit board 17 does not overlap with one end of the winding bracket 11 away from the stator poles 141. Referring also to FIG. 14, the circuit board 17 is supported on the connecting member 12, the first connecting terminal 130, the first bracket 111 and the second bracket 112. The circuit board 17 includes a circuit substrate 171, and an alternating current (AC) switch 172, a voltage dropping resistor 173, a temperature sensitive switch 175 and a magnetic sensor 176 that are connected to the circuit substrate 171.

Preferably, the AC switch 172, the voltage dropping resistor 173, the temperature sensitive switch 175 and the magnetic sensor 176 are all located on a side of the circuit substrate 171 adjacent the stator core 14. The temperature sensitive switch 175 protrudes beyond the circuit board 17 and extends between the two ends of the winding bracket 11 toward and away from the stator poles 141. The magnetic sensor 176 and the winding 16 are located on two sides of the first supporting portion 115 and/or the second supporting portion 118. The magnetic sensor 176 are disposed adjacent the two connecting terminals 13, between the two connecting terminals 13 and the connecting member 12, and at an end of the yoke 145 adjacent the stator poles 141.

Preferably, implementation of the circuit of the present embodiment may refer to the circuit described in PCT application number PCT/CN2015/086422 filed by this Applicant, the entire content of which application is incorporated by reference herein.

According to another embodiment, the circuit may be all integrated into an electronic component. The electronic component may be disposed on a circuit substrate or, alternatively, independently fixed to the stator and directly or indirectly electrically connected with the second connecting terminal and the winding, without the need of providing the circuit board.

Understandably, the circuit board 17 may optionally carry circuits other than the circuit described above.

In this embodiment, the magnetic sensor 176 is a Hall IC.

In the circuit substrate 171 has a generally square shape. The circuit substrate 171 defines two spaced inserting openings 1711 for insertion of the connecting portion 127 of the connecting member 12 and the connecting portion 1333 of the first connecting terminal 130. The inserting openings 1711 are generally square holes located adjacent two neighboring corners of the circuit substrate 171. For facilitating describing the locations of various electronic components on the circuit substrate 171, the circuit substrate 171 is divided into a first portion 1713 and a second portion 1715 by a line connecting the two inserting openings 1711. Because the two inserting openings 1711 are located adjacent two neighboring corners of the circuit substrate 171, respectively, the first portion 1713 and the second portion 1715 have different areas. The portion with a smaller area is defined as the first portion 1713, and the portion with a larger area is defined as the second portion 1715.

The connecting portion 127 of the connecting member 12 and the connecting portion 1333 of the first connecting terminal 130 are inserted into the two inserting openings 1711, respectively, such that the circuit substrate 171 is supported on the first supporting portion 115, the second supporting portion 118, and the third supporting portion 119. The connecting portion 127 of the connecting member 12 and the connecting portion 1333 of the first connecting terminal 130 are soldered to the circuit substrate 171.

The magnetic sensor 176 is disposed on the first portion 1713 of the circuit substrate 171, adjacent one inserting opening 1711. The magnetic sensor 176 is generally perpendicular to the circuit substrate 171, and extends from the circuit substrate 171 to a position close to the stator poles 141 and is disposed at one side of the passage 1411, for facilitating detecting rotation of the rotor. The AC switch 172, voltage dropping resistor 173 and temperature sensitive switch 175 are all disposed on the second portion 1715 of the circuit substrate 171. The temperature sensitive switch 175 extends out from the circuit substrate 171 and is disposed close to the winding 16 for accurate temperature detection.

In this embodiment, instead of being directly soldered to the circuit board 17, the wire end 16 is connected to the circuit board 17 through the connecting member 12, which greatly simplifies the structure of the circuit board 17. In addition, the circuit substrate 171 of this embodiment has a small area, has a length in a first direction less than the length of the winding column, and is supported only at a single end of the winding bracket 11, without the need of being supported at both ends of the winding bracket 11, which results in reduced cost and easier assembly.

Figure 15:
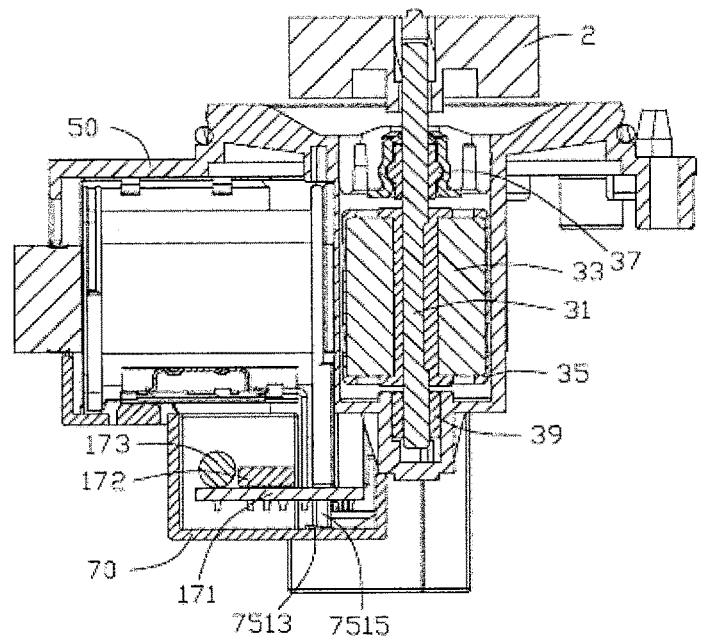
FIG. 15 is a sectional view of the motor of FIG. 1, taken along line XV-XV thereof.

Referring also to FIG. 15, the rotor 30 includes a rotary shaft 31, a magnet 33 fixed to the rotary shaft 31, a first bearing 37, and a second bearing 39. An impeller 2 is mounted to the rotary shaft 31. The first bearing 37 and the second bearing 39 are attached around the rotary shaft 31 at two ends of the magnet 33. In this embodiment, the magnet 33 is fixed to the rotary shaft 31 through a retaining bracket 35 which is formed by injection molding.

Figure 16:
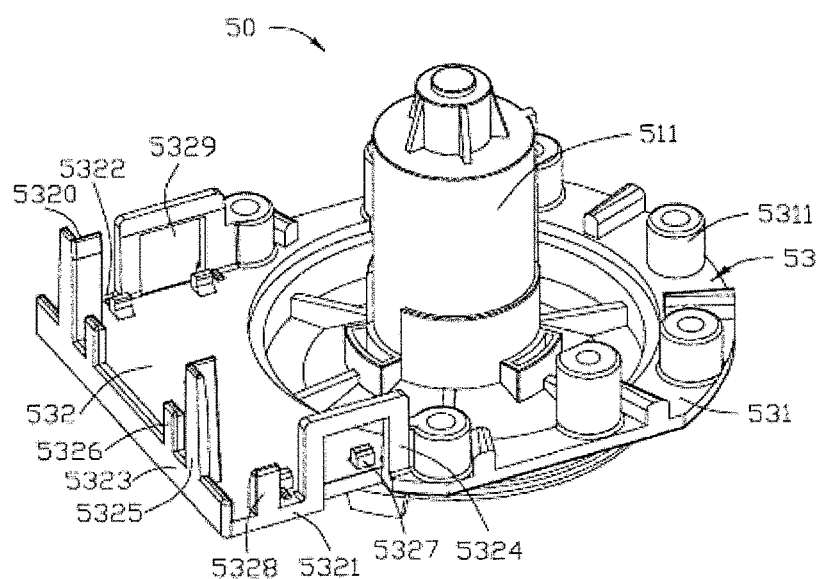
FIG. 16 is a perspective view of a base body of the motor of FIG. 1.

Referring also to FIG. 16, the base body 50 includes a cover 51 and a mounting portion 53 connected with the cover 51. The cover 51 is a generally hollow cylinder in shape and defines a receiving space 511. The cover 51 covers on the rotor 30, and the rotary shaft 31 is supported by the first bearing 37 and the second bearing 39 for rotation relative to the cover 51. The mounting portion 53 facilitates integratedly assembling the motor 1 in a using environment and allows the protective cover 70 to be mounted on the base body 50. The mounting portion 53 includes a first assembling portion 531 connected with the cover 51 and a second assembling portion 532 connected with the first assembling portion 531. In this embodiment, the first assembling portion 531 has a generally circular shape, and the second assembling portion 532 has a generally rectangular shape.

A plurality of positioning posts 5311 protrudes from a face of the first assembling portion 531 adjacent the cover 51, and a boss 5313 and a plurality of position-limiting portions 5315 protrude from a face of the first assembling portion 531 opposite from the cover 51. The positioning posts 5311 are disposed surrounding the cover 51. Each positioning post 5311 is generally a circular cylinder in shape, which defines a through hole along its central axis. The boss 5313 is generally circular and has a center recessed inwardly to be in communication with the receiving space 511. A sealing ring 5317 is attached around an outer side surface of the boss 5313. The position-limiting portions 5315 are disposed around an outer periphery of the boss 5313 and spaced from the outer side surface of the boss 5313.

The second assembling portion 532 includes a first side 5321 and a second side 5322 opposite from each other, and a third side 5323 connected with the first side 5321 and the second side 5322. In this embodiment, the first side 5321 and the second side 5322 extend in the X-axis direction and the third side 5323 extends in the Y-axis direction.

A face of the second assembling portion 532 adjacent the cover 51 is formed with a pair of snap-fit portions 5324, a pair of guiding portions 5325, a pair of supporting posts 5326, two pairs of inner stop portions 5327, and a pair of outer stop portions 5328, which all extend in the Z-axis direction.

The snap-fit portions 5324 are respectively located at the first side 5321 and the second side 5322, and are arranged in parallel and spaced from each other, for latching the protective cover 70. Each snap-fit portion 5324 defines a latching opening 5329. In this embodiment, the latching opening 5329 is generally rectangular.

The guiding portions 5325 are disposed at the third side 5323 and spaced from each other. Each guiding portion 5325 has a generally L-shaped cross-section. Each guiding portion 5325 defines a guiding groove 5320 for guiding the protective cover 70.

The supporting posts 5326 are disposed at the third side 5323 between the pair of guiding portions 5325. A height of the supporting posts 5326 is less than a height of the guiding portions 5325. The supporting posts 5326 are configured for supporting the yoke 145 and resisting the first insulation plate 1131 and the third insulation plate 1161. One of the two pairs of inner stop portions 5327 is disposed adjacent the first side 5321, and the other pair is disposed adjacent the second side 5322. The outer stop portions 5328 are respectively disposed at the first side 5321 and the second side 5322. Each outer stop portion 5328 is spaced a distance from an associated pair of inner stop portions 5327, for allowing the protective cover 70 to be inserted and positioned.

The protective cover 70, and the first connecting terminal 130 and the second connecting terminal 131 together form a power socket. The protective cover 70 covers on the winding bracket 11, the connecting member 12, part of the stator core 14, the winding 16 and the circuit board 17, and is connected with the second assembling portion 532 of the base body 50. The two connecting terminals 13 are exposed to an outside of the protective cover 70, for connecting with a power supply. Preferably, the protective cover 70 and the two connecting terminals 13 together form a power socket, into which an external plug is directly inserted.

Figure 17:
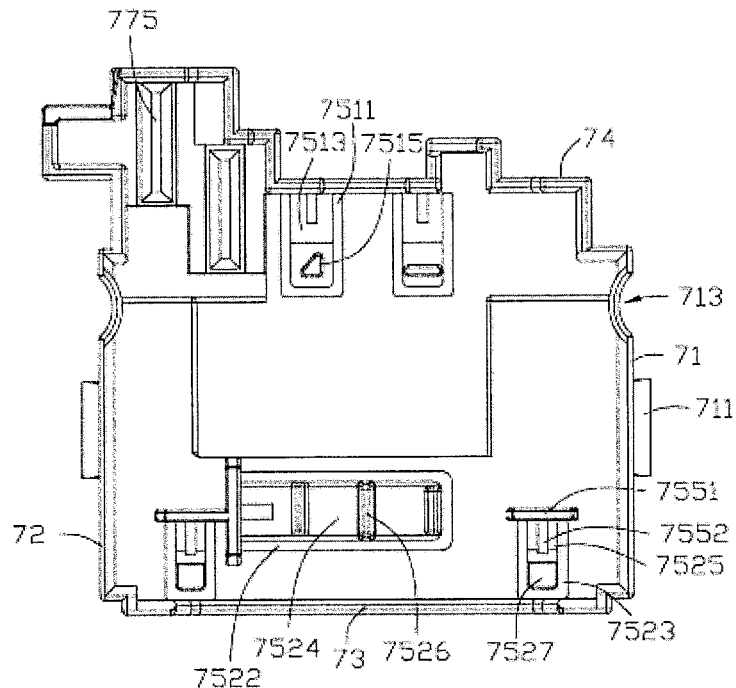
FIG. 17 is a top view of a protective cover of the motor of FIG. 1.

Referring also to FIG. 17, the protective cover 70 includes a first sidewall 71, a second sidewall 72 opposed to the first sidewall 71, a third sidewall 73 connected with the first sidewall 71 and the second sidewall 72, a fourth sidewall 74 connected with the third sidewall 73, and an end wall 75 connected with the four sidewalls. The first sidewall 71 and the second sidewall 72 are disposed along the XZ plane, and the third sidewall 73 and the fourth sidewall 74 are disposed along the YZ plane.

Locking portions 711 protrude from the first sidewall 71 and the second sidewall 72, respectively, which are configured to be detachably engaged in the latching openings 5329. The first sidewall 71 and the second sidewall 72 each further defines an arc avoidance groove 713 adjacent the fourth sidewall 74, for avoiding the two positioning posts 5311.

The third sidewall 73 defines an opening 731 for allowing the yoke 145 to pass therethrough. Two sides of the opening 731 are configured to be inserted into and received in the guiding groove 5320 of the guiding portion 5325. The fourth sidewall 74 defines another opening 741, for allowing the stator poles 141 to pass therethrough, and an edge of the opening 741 is configured to abut against the stator poles 141 and the cover 51. A positioning portion 771 protrudes from the fourth sidewall 74, for increasing a pressing force exerted on the stator poles 141 and the cover 51 and increasing a pressing area, thus resulting in more secure positioning. A terminal receiving portion 77 protrudes from a connection area between the second sidewall 72 and the fourth sidewall 74. A plurality of positioning portions 771 likewise protrudes from outer sidewalls of the terminal receiving portion 77, thereby increasing the pressing area and pressing force on the stator poles 141, the cover 51 and the mounting portion 53 and hence resulting in more secure positioning. A top face of the terminal receiving portion 77 is further formed with two inserting slots 773, and a through slot 775 is defined below each inserting slot 773. The inserting slot 773 is greater than the through slot 775 in width. After respectively passing through the through slots 775, the connecting end 1317 and connecting end 1337 of the two connecting terminals 13 are received in the two inserting slots 773.

The end wall 75 is a stepped wall, including a first end face 751, a second end face 752, and a plurality of side faces connected with the first end face 751 and the second end face 752. The first end face 751 and the second end face 752 are disposed along the XY plane. The first end face 751 has a greater height than the second end face 752. The terminal receiving portion 77 has a greater height than the first end face 751.

The first end face 751 defines two first receiving slots 7511. A first pressing tab 7513 protrudes from an edge of each first receiving slot 7511, and each first pressing tab 7513 is received in the corresponding first receiving slot 7511. Each first pressing tab 7513 has a distal end inclined slightly toward the protective cover 70. A pressing protrusion 7515 protrudes from an inner surface of each first pressing tab 7513, and the pressing protrusion 7515 is disposed on the distal end of the first pressing tab 7513.

The second end face 752 defines a second receiving slot 7522 and two third receiving slots 7523. The two third receiving slots 7523 are closer to the third sidewall 73 than the second receiving slot 7522, and the second receiving slot 7522 is located between the two third receiving slots 7523. The second receiving slot 7522 is located corresponding to the position of the temperature sensitive switch 175, and the two third receiving slots 7523 are located corresponding to the positions of the first insulation plate 1131 and the third insulation plate 1161, respectively.

A second pressing tab 7524 protrudes from an edge of the second receiving slot 7522. A third pressing tab 7525 protrudes from an edge of each third receiving slot 7523. In this embodiment, the second pressing tab 7524 is generally perpendicular to the two third pressing tabs 7525. The second pressing tab 7524 is disposed in parallel with the Y-axis, and the third pressing tab 7525 is disposed in parallel with the X-axis. A length of the second pressing tab 7524 is greater than a length of each third pressing tab 7525. The second pressing tab 7524 and the third pressing tabs 7525 each have a distal end inclined slightly toward the protective cover 70. At least one pressing protrusion 7526 protrudes from an inner surface of the second pressing tab 7524. In this embodiment, there are three pressing protrusions 7526 which are spaced from each other. A pressing protrusion 7527 protrudes from an inner surface of each third pressing tab 7525, and the pressing protrusion 7527 is disposed on the distal end of the third pressing tab 7525. The pressing protrusions of the second pressing tab 7524 abut against the temperature sensitive switch 175. The pressing protrusions 7527 of the two third pressing tabs 7525 abut against the first insulation plate 1131 and the third insulation plate 1161, respectively.

A connection reinforcement structure 755 is formed at a connection area between each of the first pressing tab 7513, the second pressing tab 7524 and the third pressing tab 7525 and the edge of one corresponding receiving slot, thus reinforcing the connection of each pressing tab to the end wall 75. Each connection reinforcement structure 755 includes a reinforcement protrusion 7551 disposed at the edge of one corresponding receiving slot, and a reinforcement portion 7552 connecting the reinforcement protrusion 7551 to the corresponding pressing tab. In this embodiment, the reinforcement protrusion 7551 is generally plate-shaped, the reinforcement portion 7552 is generally triangle-shaped, and the reinforcement protrusion 7551 is generally perpendicular to the reinforcement portion 7552. It should be understood that, in another embodiment, one, two or all of the first pressing tab 7513, the second pressing tab 7524, and the third pressing tab 7525 can be omitted.

Assembly of the motor 1 may include, but is not limited to, the following steps.

Assembly of the rotor 30: the rotary shaft 31 passes through the magnet 33, and the first bearing 37 and the second bearing 39 are attached around two ends of the rotary shaft 31.

Assembly of the rotor 30 with the base body 50: the cover 51 of the base body 50 is placed to cover on the rotor 30 and is attached around the first bearing 37 and the second bearing 39.

Figure 18:
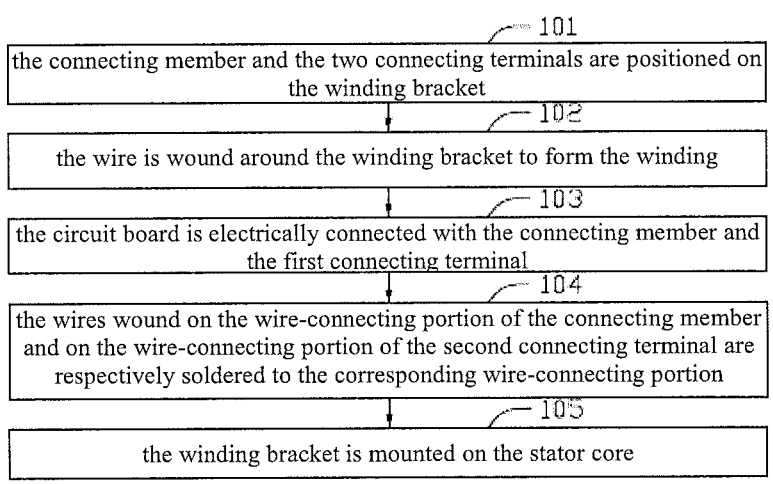
FIG. 18 is a flow chart of an assembly method of the motor of FIG. 1.

Referring to FIG. 18, assembly of the stator 10 includes the following steps.

Step 101: the connecting member 12 and the two connecting terminals 13 are positioned on the winding bracket 11, for example, by inserting the connecting member 12 and the two connecting terminals 13 into the first receiving slot 1141 and the two second receiving slots 1171, respectively.

Figure 19:
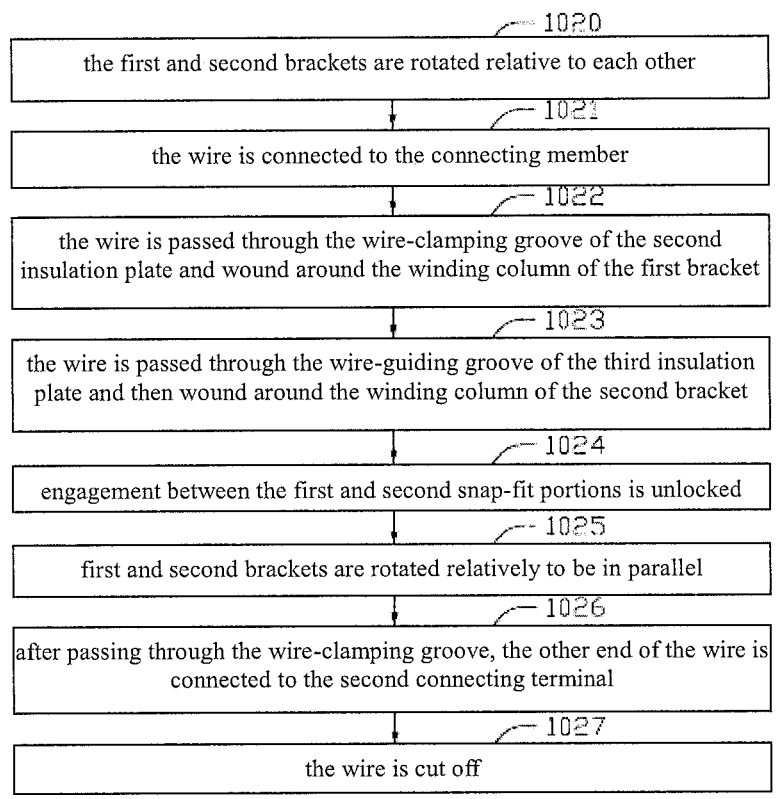
FIG. 19 is a flow chart of an assembly method of the stator of the motor of FIG. 1.

Step 102: the wire is wound around the winding bracket 11 to form the winding. Referring also to FIG. 19, forming the winding includes the following detailed steps.

Step 1020: the first bracket 111 and the second bracket 112 are rotated relative to each other to facilitate the winding. In this embodiment, the first bracket 111 and the second bracket 112 are rotated to the position where the third insulation plate 1161 is stacked with the first insulation plate 1131, and the two second snap-fit portions 1164 are respectively engaged with the two first snap-fit portions 1134, such that the winding column 1130 of the first bracket 111 and the winding column 1160 of the second bracket 112 are arranged on the same straight line.

Step 1021: one end of a wire is connected to the connecting member 12, for example, by winding the wire on the wire-connecting portion 123 of the connecting member 12. In this embodiment, the wire is wound several turns on the wire-connecting portion 123 to fix the one end of the wire.

Step 1022: the wire is passed through the wire-clamping groove 1135 of the second insulation plate 1132 and wound around the winding column 1130 of the first bracket 111.

Step 1023: the wire is passed through the wire-guiding groove 1165 of the third insulation plate 1161 and then wound around the winding column 1160 of the second bracket 112.

Step 1024: the engagement between the second snap-fit portion 1164 and the first snap-fit portion 1134 is unlocked.

Step 1025: the first bracket 111 and the second bracket 112 are rotated relatively to a position where the first bracket 111 and the second bracket 112 are arranged in parallel with each other.

Step 1026: after passing through the wire-clamping groove 1166, the other end of the wire is connected to the second connecting terminal 131, for example, by winding the wire on the wire-connecting portion 1313 of the second connecting terminal.

Step 1027: the wire is cut off.

Step 103: the circuit board 17 is fixed to the winding bracket 11 and is electrically connected with the connecting member 12 and the first connecting terminal 130, for example, by inserting the connecting portion 127 of the connecting member 12 and the connecting portion 1333 of the first connecting terminal 130 into the two inserting openings 1711 of the circuit substrate 171.

Step 104: the wire wound on the wire-connecting portion 123 of the connecting member 12 is soldered to the wire-connecting portion 123, and the wire wound on the wire-connecting portion 1313 of the second connecting terminal 131 is soldered to the wire-connecting portion 1313, the circuit substrate 171 of the connecting portion 127 of the connecting member 12 are soldered, and the circuit substrate 171 and the connecting portion 1333 of the first connecting terminal 130 are soldered.

Step 105: the winding bracket 11 is mounted on the stator core 14, i.e. the two branches 143 of the stator core 14 are respectively passed through the first bracket 111 and the second bracket 112 and engaged with the connecting portion 144.

The assembled rotor 30 and the base body 50 as a whole is passed through the stator poles 141 of the stator core 14.

The protective cover 70 is placed to cover on the winding bracket 11, the connecting member 12, part of the stator core 14, the winding 16, and the circuit board 17, and is locked with the base body 50. After respectively passing through the two through slots 775, the two connecting terminals 13 are received in the two inserting slots 773.

It should be understood that the assembly sequence may vary in other embodiments. For example, mounting the circuit board 17 at step s103 may be performed after step S105, or before covering of the protective cover 70. During the soldering operation of step 104, soldering the wire to the two wire-connecting portions may be performed immediately after winding around the respective first bracket and the second bracket is completed, or the whole winding is completed, and soldering the circuit substrate 171 may be performed before the protective cover 70 is mounted. When connecting the wire, the wire may be first connected to the connecting wire 12 or, alternatively, may be first connected to the power supply terminals. In assembly of the stator, the winding bracket may not be used. Instead, another insulation member, such as insulation paper or an insulation layer, may be used for insulation purposes.

During the above winding process, the connecting terminals 13 and the connecting member 12 are disposed on the winding bracket 11. Therefore, during the winding process, the wire can be first wound on one of the connecting member 12 and the connecting terminals 13, and then wound around the winding bracket 11, and finally wound around another of the connecting member 12 and the connecting terminals 13 to form the winding 16. Therefore, during this process, the whole winding process and the subsequent soldering process can be performed automatically by existing automation equipment, which greatly reduces the time and cost of manual winding. In addition, during the winding process, two wire-clamping grooves and the wire-guiding groove are used to guide the wire, which further facilitates the automated winding process and results in neater wire arrangement in the finished winding.

In addition, during the assembly process of the stator 10, besides the automated winding process, mounting the circuit board 17 can also be performed automatically. In mounting the circuit board 17, automation equipment can be used to place the circuit board on the winding bracket 11, with the connecting member 12 and the connecting terminals 13 inserted into the circuit board, and then the soldering process is performed, which further realizes the automation of the assembly process.

In another embodiment, the circuit board 17 can be mounted on only the connecting member 12 and the first connecting terminal 130, or mounted on only the winding bracket 11. When the circuit board 17 is mounted on the connecting member 12 and the first connecting terminal 130, or mounted on one end of the winding bracket adjacent the rotor, it is possible to arrange the magnetic sensor 176 adjacent the rotor. It should be understood that, in another embodiment where only the above circuit board mounting manner is desired, other parts of the motor 1 can be the same as in the existing motors, for example, the wire can be wound and connected in a manner different from those described herein in this embodiment, and the base body 50 can be omitted.

The connecting member 12 and the connecting terminals 13 are disposed on the winding bracket 11, the circuit board 17 is electrically connected with the connecting member 12 and the second connecting terminal 131, and two wire ends of the winding are electrically connected with the connecting member 12 and the first connecting terminal 130, respectively. Therefore, it is unnecessary to directly connect the wire ends of the winding to the circuit board 17. This connection structure uses the connecting member and the connecting terminals, which facilitates winding the wire and mounting the circuit board 17 and facilitates achieving automated winding process and circuit board mounting process.

In this embodiment, the two connecting terminals 13 of the motor are disposed at the same end of the winding bracket 11 adjacent the rotor or stator poles. Therefore, the circuit board 17 electrically connected with the second connecting terminal 131 is likewise adjacent the rotor or stator poles, which facilitates disposing the magnetic sensor 176 of the circuit board 17 adjacent the rotor to detect rotation of the rotor. In addition, disposing the two connecting terminals 13 at the same end facilitates the arrangement of other components as well as reducing travel of the automation equipment during the soldering and winding process.

It should be understood that, in another embodiment where it is only desired to dispose the two connecting terminals 13 at the same end adjacent the rotor, other parts of the motor can be the same as in the existing motors, for example, the wire can be wound and connected in a manner different from those described herein in this embodiment, the mounting structure of the circuit board 17 can be configured differently, and the base body 50 can be omitted.

The arrangement of the two connecting terminals 13 in this embodiment is different from that of the existing motors. In the existing motors, the terminals are usually arranged on the two brackets of the winding bracket, while the two connecting terminals 13 in this embodiment are arranged on the same bracket of the winding bracket. As a result, the motor has a compact interior structure, which facilitates the arrangement of other components.

Figure 20:
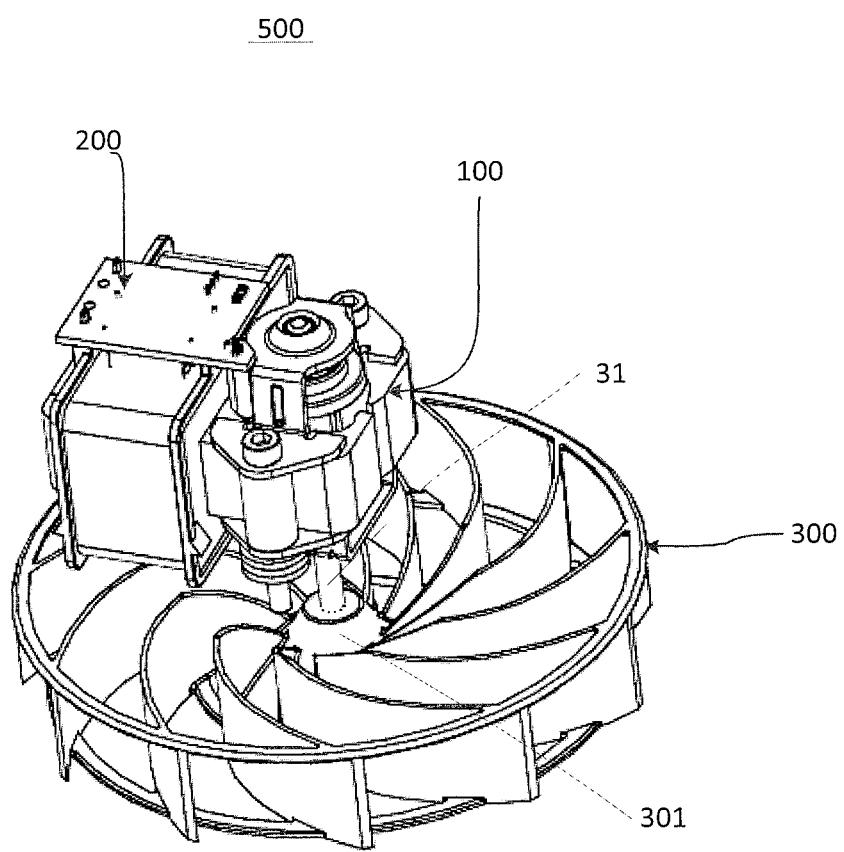
FIG. 20 illustrates a ventilation fan according to one embodiment of the present invention.

Referring to FIG. 20, a ventilation fan 500 according to an embodiment of the present invention includes an impeller 300 and a single phase motor 100. The impeller 300 includes a mounting portion 301 mounted to one end of a rotary shaft 31 of the single phase motor 100, so that the impeller 300 is driven to rotate by the rotary shaft 31. In this embodiment, the single phase motor 100 is a single phase synchronous alternating current motor. In comparison with the traditional shaded pole motor, the single phase motor of the present invention has a compact structure and is convenient to repair and replace. In this embodiment, the impeller 300 is a centrifugal impeller and has an outer diameter significantly greater than the size of the single phase motor 100.

Figure 21:
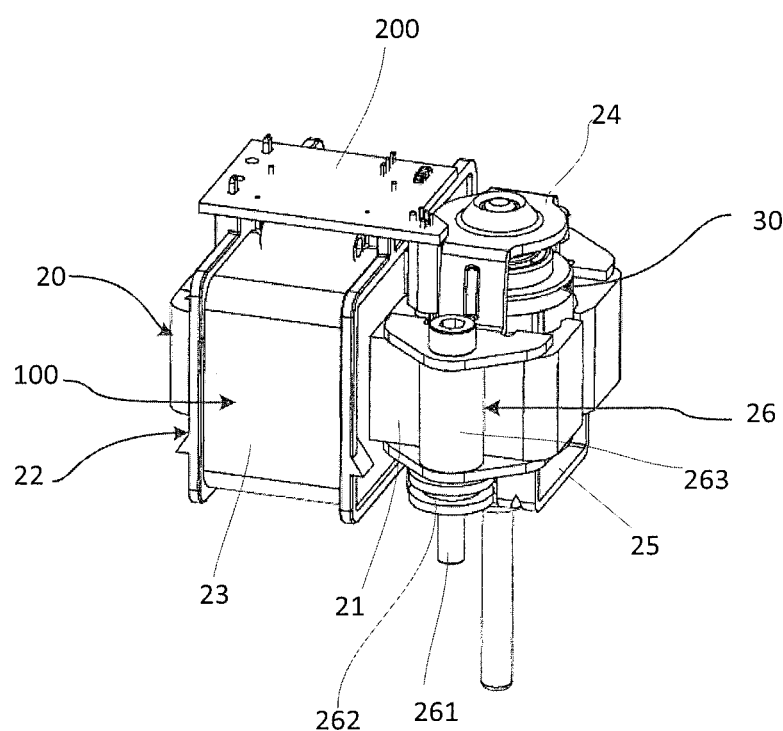
FIG. 21 illustrates a motor assembly of the ventilation fan of FIG. 20.

Referring to FIG. 21, the single phase motor 100 includes a stator 20 and a rotor 30 rotatable relative to the stator 20. The stator 20 includes a stator core 21, an insulating bracket 22 mounted to the stator core 21, and a winding 23 wound around the insulating bracket 22. In this embodiment, the PCB board 200 is mounted to the insulating bracket 22 adjacent the winding 23. Preferably, the PCB board 200 is mounted to one side of the insulating bracket 22 opposite from the impeller 300. This can make the structure of the single phase motor 100 more compact and reduce the size of the single phase motor 100. In addition, during operation of the impeller 300, a low pressure area is formed at a central region of the impeller 300, which causes external air to flow to this low pressure area, and the single phase motor 100, the PCB board 200 and the winding 23 are located in this low pressure area. Therefore, a flow passage exists between the PCB board 200 and the impeller 300, which allows air to flow therethrough. This airflow may flow over and directly cool the PCB board 200, thus prolonging the lifespan of the PCB board 200. Because the outer diameter of the impeller 300 is significantly greater than the size of the single phase motor 100, the PCB board 200 can be sufficiently cooled. In an alternative embodiment, the impeller 300 may also be an axial impeller.

The stator 200 further includes a first support bracket 24 and a second support bracket 25 respectively mounted to two axial sides of the stator core 21. The stator core 21 is made from a magnetic-conductive material. The first support bracket 24 and the second support bracket 25 are configured to support the rotary shaft 31 of the rotor 30. The first support bracket 24 and the second support bracket 25 are interconnected through an axial connecting mechanism 26 so as to sandwich the stator core 21 between the first and second support brackets 24, 25. In this embodiment, each of the first support bracket 24 and the second support bracket 25 is an integrally formed member, which is convenient to fabricate. Bearing seats are disposed in the first support bracket 24 and the second support bracket 25, for mounting of bearings 24a, 25a (FIG. 26), respectively. The two bearings 24a, 25a support the rotary shaft 31 such that the rotary shaft 31 is capable of rotation relative to the stator 20.

The connecting mechanism 26 includes a screw 261, an associated screw nut 262, and a positioning sleeve 263. The first support bracket 24 and the second support bracket 25 form through holes for allowing the screw 261 to pass therethrough. The positioning sleeve 263 is attached around the screw 261 and disposed between the first support bracket 24 and the second support bracket 25 for axially positioning and supporting the first support bracket 24 and the second support bracket 25 and improving the appearance.

Figure 22:
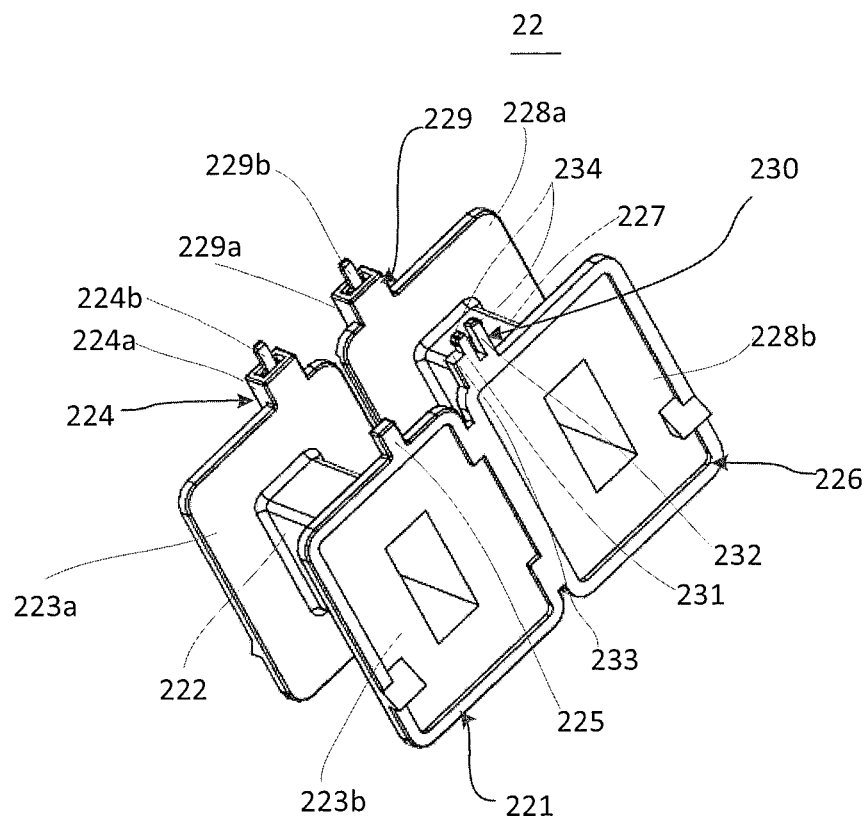
FIG. 22 illustrates an insulating bracket of the single phase motor of FIG. 21.

Referring to FIG. 22, in this embodiment, the insulating bracket 22 includes a first insulating bracket 221 and a second insulating bracket 226 that are integrally formed. The first insulating bracket 221 and the second insulating bracket 226 include integrally formed main portions 222, 227, respectively. Side plates 223a, 223b are formed at two ends of the main portion 222, and side plates 228a, 228b are formed at two ends of the main portion 227. The main portions 222, 227 are attached around the stator core 21. The winding 23 includes a first winding and a second winding that are wound around the main portions 222, 227, respectively.

Top ends of one side plate 223a and one side plate 228a of the first insulating bracket 221 and the second insulating bracket 226 form protruding first mounting portions 224, 229, respectively. Top ends of the other side plate 223b and the other side plate 228b of the first insulating bracket 221 and the second insulating bracket 226 form protruding second mounting portions 225, 230, respectively. The first mounting portions 224, 229 and the second mounting portions 225, 230 are configured for mounting of the PCB board 200.

The first mounting portion 224 of the first insulating bracket 221 and the first mounting portion 229 of the second insulating bracket 226 include support portions 224a, 229a and connecting members 224b, 229b disposed at top ends of the support portions 224a, 229a, respectively. The support portions 224a, 229a are flush with the side plates 223a, 228a. The connecting members 224b, 229b pass through first through holes of the PCB board 200 to position and fixedly connect the PCB board 200. The top ends of the support portions 224a, 229a abut against an underside of the PCB board 200 to support the PCB board 200.

The top end of the second mounting portion 225 of the first insulating bracket 221 abuts against the underside of the PCB board 200 to support the PCB board 200. The second mounting portion 230 of the second insulating bracket 226 includes a support portion 233 and two parallel connecting members 231, 232 disposed on the support portion 233. The support member 233 abuts against the underside of the PCB board 200 to support the PCB board 200. Ends of the two connecting members 231, 232 are formed with two barbs 234, respectively. The two connecting members 231, 232 pass through a second through hole of the PCB board 200, with the barbs 234 engaged with a top side of the PCB board 200 to hold the PCB board 200 and prevent the PCB board 200 from becoming loosened.

Figure 23:
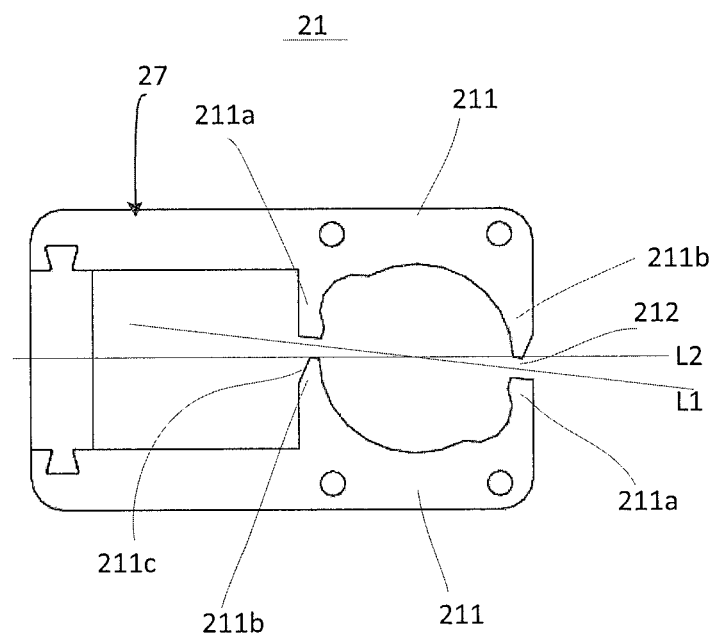
FIG. 23 is a plane view of a stator core of the single phase motor of FIG. 21.

Referring to FIG. 23, the stator core 21 includes a generally U-shaped yoke 27, and two pole portions (also referred to as stator poles) 211 extending toward each other from two opposing side portions of the yoke 24. The first insulating bracket 221 and the second insulating bracket 226 are mounted to the two opposing side portions, respectively. Each pole portion 211 includes a short pole shoe 211a and a long pole shoe 211b extending from two sides of the pole portion 211. Because of asymmetry of the pole portion 211, the single phase motor 100 has different startup capability in opposite directions, i.e. the startup capability in one startup direction being greater than the startup capability in the other startup direction. Between the two pole portions 211, the short pole shoe 211a of each pole portion 211 and the long pole shoe 211b of the other pole portion 211 are located adjacent to each other and form a slot opening 212 therebetween. As such, a center of the slot opening 212 is offset from a center line or an axis of symmetry L2 of the stator core 21 along a length direction of the stator core 21. A line L1 connecting the centers of the two slot openings 212 is inclined relative to the axis of symmetry L2 by an angle of 0 to 30 degrees. This design facilitates increasing the magnetic reluctance between the two pole portions 211, which reduces the inductance, enhances the unidirectional startup capability and working efficiency, and increases the power factor. In this embodiment, end surfaces of the short pole shoe 211a and long pole shoe 211b of each pole portion 211 facing the respective slot openings 212 are parallel to the line L1. The long pole shoe 211b of each pole portion 211 has a beveled portion 211c such that a radial thickness of the long pole shoe 211b progressively decreases in a direction toward the respective slot opening 212, thereby reducing the inductance and enhancing the unidirectional startup capability of the single phase motor 100.

Figure 24:
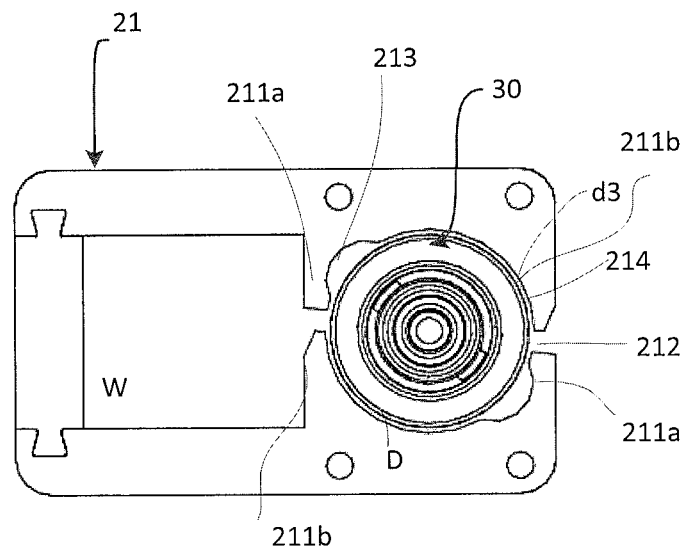
FIG. 24 is a plane view of the stator core and a rotor of the single phase motor of FIG. 21.

Referring to FIG. 24, the rotor 30 is received in a space defined by the short pole shoes 211a and long pole shoes 211b of the two pole portions 211. Each pole portion 211 forms a positioning groove 213 facing the rotor 30. The positioning groove 213 is offset from a center of the pole portion 211 and located away from the long pole shoe 211b. This configuration makes the length difference between the long pole shoe 211b and short pole shoe 211a of each pole portion 211 even greater, thereby better controlling the stop position of the rotor 30 to make the stop position of the rotor 30 offset from a dead point and make it easier for the rotor 30 to start in one direction than in the other direction. Preferably, a bottom of the positioning groove 213 is arc-shaped. It should be understood that the bottom of the positioning groove 213 can also be V-shaped.

An outer circumferential surface of the rotor 30 is located on a same circumference in an axial plan view of stator 100. Inner surfaces of the short pole shoe 211a and long pole shoe 211b of each pole portion 211 are inwardly-recessed arc pole faces. The pole faces of the short pole shoe 211a and long pole shoe 211b are located on a same circumference in the axial plan view of the stator 100. The pole faces of the short pole shoe 211a and the long pole shoe 211b are concentric with the outer circumferential surface of the rotor 30, i.e. the pole faces of the short pole shoe 211a and long pole shoe 211b and the outer circumferential surface of the rotor 30 are all centered at the center of the rotor 30. Therefore, an air gap 214 with an even thickness is formed between the short pole shoe 211a, the long pole shoe 211b and the rotor 30, which can improve the smoothness and stability and hence reliability of the startup of the single phase motor 100.

In this embodiment, the slot opening 212 has a width (i.e. a distance between the short pole shoe 211a and long pole shoe 211b at opposite sides of the slot opening 212) greater than a thickness d3 of the air gap 214.

In this embodiment, the outer profile of the stator core 21 overall is rectangular in shape. A width of the stator core 21 is indicated by W, an outer diameter of the rotor 30 is indicated by D, and the outer diameter D of the rotor 30 is 50%-70% of the width W of the stator core 21. This configuration reduces the size and the cost of the single phase motor 100, which makes the single phase motor 100 more cost-effective.

Figure 25:
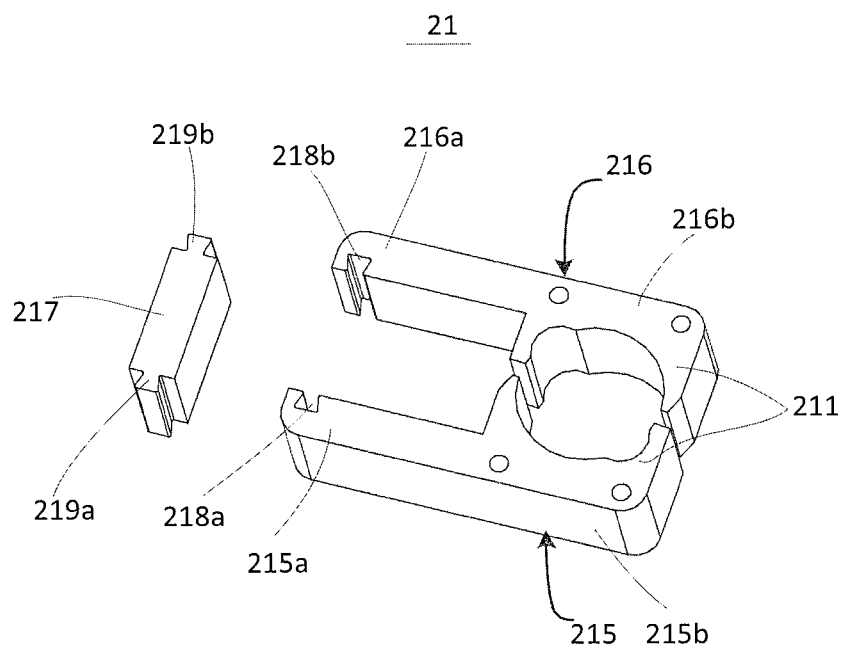
FIG. 25 is an exploded view of the stator core of FIG. 23.

Referring to FIG. 25, the stator core 21 is frame shaped with an opening. The stator core 21 includes a first core part 215 and a second core part 216 that are connected by a magnetic-conductive connecting piece 217. The main portion 222 of the first insulating bracket 221 and the main portion 227 of the second insulating bracket 226 are attached around the first core part 215 and the second core part 216, respectively.

A first end 215a of the first core part 215 and a first end 216a of the second core part 216 are respectively formed with dovetail mortises 218a, 218b. Two opposite ends of the magnetic-conductive connecting piece 217 are respectively formed with dovetail tenons 219a, 219b. The dovetail tenons 219a, 219b are engaged in the dovetail mortises 218a, 218b, such that the first core part 215, the second core part 216 and the magnetic-conductive connecting piece 217 are lockingly connected together. A second end 215b of the first core part 215 and a second end 216b of the second core part 216 form the two opposed pole portions 211, respectively.

In this embodiment, both the first core part 215 and the second core part 216 are F-shaped.

In an alternative embodiment, both the first core part 215 and the second core part 216 are E-shaped.

It should be understood that the first core part 215 and the second core part 216 may also be directly connected by engagement between a dovetail mortise/dovetail tenon at the first end 215a of the first core part 215 and a dovetail tenon/dovetail mortise at the first end 216a of the second core part 216, without using the magnetic-conductive connecting piece 217.

Figure 26:
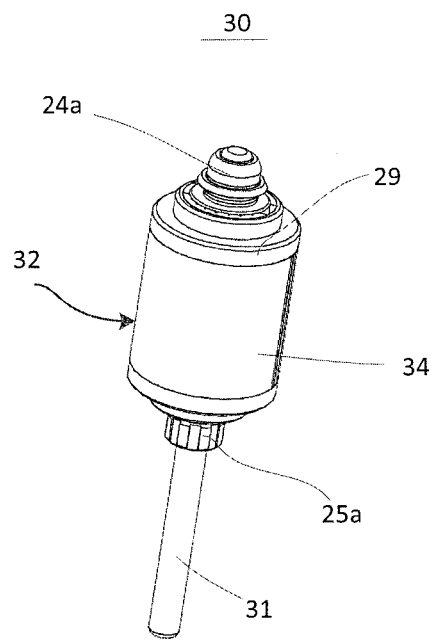
FIG. 26 illustrates a rotor of the single phase motor of FIG. 21.

Referring to FIG. 26, the rotor 30 includes a rotary shaft 31, a rotor main body 32 and a buffering device 350. The rotor main body 32 is attached around the rotary shaft 31. The rotary shaft 31 is supported by the two bearings 24a, 25a. The two bearings 24a, 25a are located outside two ends of the rotor main body 32, such that the rotor 30 is rotatable relative to the stator 20. The rotor main body 32 includes a magnetic member mounting bracket 29 and a permanent magnet member 34. The magnetic member mounting bracket 29 is an injection-molded part. The permanent magnet member 34 is mounted to an outer side of the magnetic member mounting bracket 29, and an outer circumferential surface of the permanent magnet member 34 is located on a same circumference in an axial plan view of the rotor.

Figure 27:
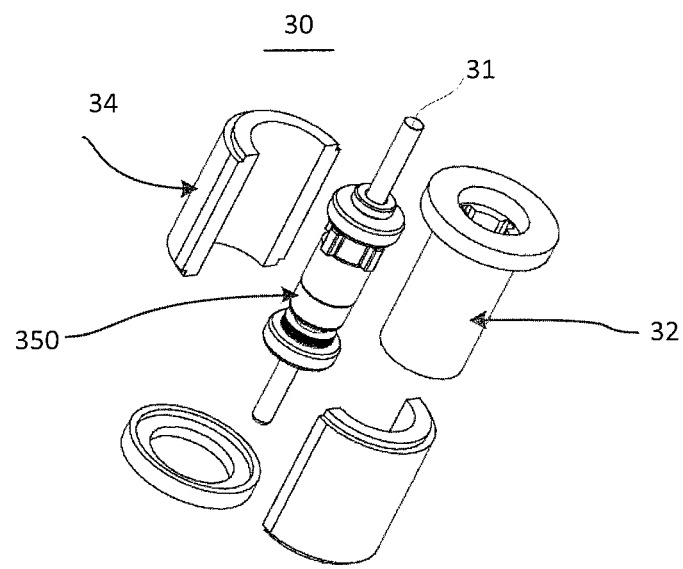
FIG. 27 and FIG. 28 are exploded view of the rotor of FIG. 26.
Figure 28:
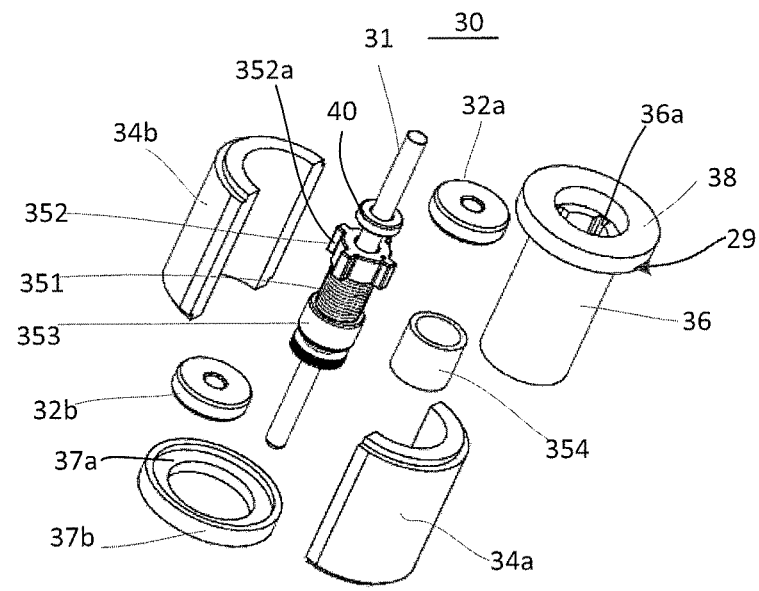

In particular, referring to FIG. 27 and FIG. 28, the rotor main body 32 and the rotary shaft 31 have a sliding fit with each other to allow for a rotation speed difference therebetween. The buffering device 350 is disposed within the rotor main body 32 and attached around the rotary shaft 31. The buffering device 350 has one end connected to the rotor main body 32, and the other end of the buffering device 350 is connected to the rotary shaft 31, for synchronizing with time delay the rotation speeds between the rotor main body 32 and the rotary shaft 31, which can effectively reduce or eliminate the occurrence of the startup failure or stall of the motor 100. The buffering device 350 is disposed in the interior of the rotor main body 32 and hence one end of the rotary shaft 31 of the single phase motor 100 is directly connected to the load, which results in a more compact structure of the motor 100 and facilitates repairmen and replacement of the motor 100.

The magnet member mounting bracket 29 of the rotor main body 32 includes a hollow cylindrical portion 36, a lower cover 37b fixedly attached around a lower end of the hollow cylindrical portion 36, and a sleeve ring 38 formed at an upper end of the hollow cylindrical portion 36. The hollow cylindrical portion 36 and the sleeve ring 38 are injection-molded integral parts which can be convenient to fabricate. The permanent magnet member 34 is formed by two arcuate permanent magnet members 34a, 34b attached to the outer side of the hollow cylindrical portion 36. Two bearings 32a, 32b are respectively mounted within two ends of the hollow cylindrical portion 36. The two bearings 32a, 32b have a sliding fit with the rotary shaft 31, which allows the rotor main body 32 to freely rotate relative to the rotary shaft 31. The buffering device 350 is disposed between the two bearings 32a, 32b, which can prevent axial displacement of the rotor main body 32.

The sleeve ring 38 and the lower cover 37b have opposed grooves, and the groove 37a of the lower cover 37 is opposed to the groove (which is invisible in the figures) of the sleeve ring 38. Two ends of the permanent magnet member 34 are engaged in the grooves to axially position the permanent magnet member 34.

The buffering device 350 includes an elastic member 351, and a first connecting base 352 and a second connecting base 353 connected to two ends of the elastic member 351. The elastic member 351 and the first connecting base 352 is movably attached around the rotary shaft 31, and the second connecting base 353 is fixedly attached around the rotary shaft 31. The hollow cylindrical portion 36 surrounds an outer circumferential side of the buffering device 350. The first connecting base 352 is connected to the hollow cylindrical portion 36. Specifically, in this embodiment, the first connecting base 352 includes four circumferentially arranged protruding blocks 352a, and an inner wall surface of the hollow cylindrical portion 36 includes grooves 36a engaged with the protruding blocks 352a so as to connect the first connecting base 352 with the hollow cylindrical portion 36.

The rotor 30 further includes a limiting ring 40 fixedly attached to the rotary shaft 31 and disposed outside one end of the rotor main body 32 away from the second connecting base 353. As such, the two ends of the rotor main body 32 are respectively position-limited by the second connecting base 353 and the limiting ring 40. During operation of the single phase motor 100, the limiting ring 40 axially limits the rotor main body 32, which prevents axial movement of the rotor main body 32.

In this embodiment, the buffering device 350 further includes an elastic sleeve 354. The sleeve 354 is disposed at an inner side of the hollow cylindrical portion 36 and surrounds an outer circumferential side of the elastic member 351. Two ends of the sleeve 354 are fixedly connected to the first connecting base 352 and the second connecting base 353, respectively. Preferably, the material of the sleeve 354 is a soft material such as rubber or foamed plastic, which on one hand achieves shock-absorbing and noise reduction results and, on the other hand, prevents the elastic member 351 from directly striking on the hollow cylindrical portion 36 when an outer diameter of the elastic member 351 increases.

In this embodiment, the elastic member 351 is a helical spring movably attached around the rotary shaft 31. When the motor 100 begins starting, the rotor main body 32 rotates under the driving of the electromagnetic force of the stator 20. One end of the rotary shaft 31 is directly connected with the load so that the rotary shaft 31 has a large inertia, and the rotary shaft 31 has a sliding fit with the rotor main body 32. Therefore, at this time, the rotation speed of the rotor main body 32 is greater than the rotation speed of the rotary shaft 31, i.e. a rotation speed difference exists between the rotor main body 32 and the rotary shaft 31. The helical spring is pulled by the rotation of the rotor main body 32, such that the end of the helical spring that is connected to the first connecting base 352 is tightened with its inner diameter gradually decreasing. As a result, the end of the helical spring that is connected to the second connecting base 353 is also gradually tightened, and the rotation speed of the rotor main body 32 is eventually synchronous with the rotation speed of the rotary shaft 31, which effectively reduces the inertia of the single phase motor 100 brought by the load at the startup. When the motor 100 stops from an operation state, because of the large rotational inertia of the load, the rotation speed of the rotary shaft 31 is greater than the rotation speed of the rotor main body 32, i.e. a rotation speed difference exists between the rotor main body 32 and the rotary shaft 31, such that the end of the helical spring that is connected to the second connecting base 353 is gradually loosened with its inner diameter gradually increasing. As a result, the end of the helical spring that is connected to the first connecting base 352 is also gradually loosened, and the rotation speed of the rotor main body 32 is eventually synchronous with the rotation speed of the rotary shaft 31, such that the load can be effectively reduced. During this course, the sleeve 354 surrounds the helical spring, which prevents the helical spring from being damaged due to over-increasing of its inner diameter.

The single phase motor 100 of the present invention has a compact structure and has the advantages of strong unidirectional startup capability, high working efficiency, high power factor and low cost. Therefore, the ventilation fan 500 using the single phase motor 100 of the embodiment of the present invention has high working efficiency, low cost and long lifespan.

It should be understood that the single phase motor 100 of the present invention can also be used in devices having a unidirectional startup requirement of the single phase motor 100, such as a warm-air machine, an air conditioner or a water pump.

Figure 29:
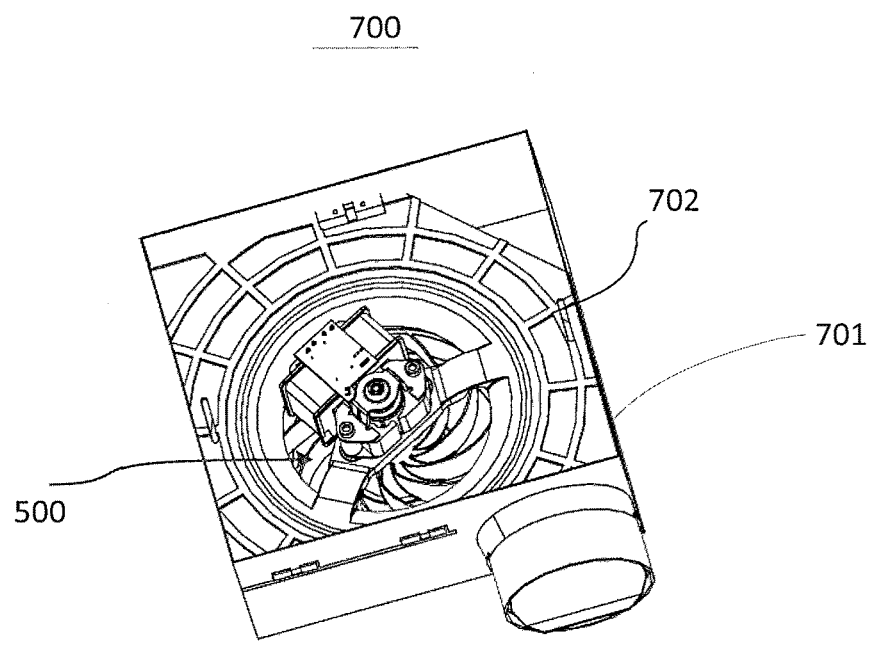
FIG. 29 illustrates an electronic device using the ventilation fan of FIG. 20.

FIG. 29 illustrates an electronic device 700 using the ventilation fan 500 of the embodiment of the present invention. The electronic device 700 includes an outer housing 701 and a mounting bracket 702 disposed in an interior of the outer housing 701. The ventilation fan 500 is mounted to the mounting bracket 702. The electronic device 700 using the ventilation fan 500 of the embodiment of the present invention has high work efficiency, long lifetime and low cost. The electronic device 700 can be, for example, an air ventilation device, a ventilation and cooling device, a range hood, or the like.

It should be understood that a motor in accordance with another embodiment can include part of the structures of the above embodiment, and other structures can be substituted by existing structures, for example, the winding bracket can be substituted by another insulation structure or another insulation means, and the electronic circuit may include all structures or components of the circuit except for the circuit board.

The embodiments described above are preferred embodiments of the present invention, and should not be used to limit the scope of the present invention in any way. Various other modifications can be apparent to persons skilled in the field without departing from the scope of the invention, and all of such modifications should fall within the scope of the present invention.

The invention claimed is:

1. A stator comprising:
a stator core including stator poles and a yoke connecting the stator poles;
at least one winding wound around the stator core;
a winding bracket arranged between the stator core and the at least one winding, at least one support portion arranged at one end of the winding bracket adjacent the stator poles; and
a circuit board fixed to the winding bracket and supported by the at least one support portion,
wherein the winding bracket supports the circuit board only at one end of the winding bracket adjacent the stator poles.

2. The stator of claim 1, wherein a number of the stator poles is two and the yoke is in a U-shaped form.

3. The stator of claim 1, further comprising a connecting member electrically connecting the at least one winding with the circuit board, the connecting member being separately formed and soldered to the circuit board.

4. The stator of claim 1, further comprising a first connecting terminal which includes a body, a connecting end for connecting to a power source, a connecting portion electrically connected with the circuit board, the body, the connecting end and the connecting portion of the first connecting terminal being all integrally formed as a monolithic member.

5. The stator of claim 4, further comprising a second connecting includes a body, a connecting end for connecting to the power source and a wire-connecting portion electrically connected with the at least one winding, the body, the connecting end and the wire-connecting portion of the second connecting terminal being all integrally formed as a monolithic member.

6. The stator of claim 1, wherein the circuit board has no overlap with the end of the winding bracket away from the stator poles.

7. The stator of claim 1, wherein the circuit board includes a magnetic sensor, the magnetic sensor and the at least one winding being located at two opposite sides of the at least one support portion respectively.

8. The stator of claim 1, wherein the circuit board is supported only at one end of the winding bracket adjacent the stator poles.

9. A stator comprising:
a stator core including stator poles and a yoke connecting the stator poles;
at least one winding wound around the stator core;
connecting terminals configured to connect with an external power source to supply power to the at least one winding and located at one end of the yoke adjacent the stator poles;
a winding bracket between the stator core and the at least one winding, the connecting terminals being fixed to the winding bracket; and
an electronic circuit and a connecting member disposed on the winding bracket, the connecting member being separately formed and electrically connected to the at least one winding with the electronic circuit,
wherein the connecting member, the connecting terminals and the electronic circuit are all disposed on the winding bracket and located at one end of the yoke adjacent the stator pole.

10. A stator comprising:
a stator core including stator poles and a yoke connecting the stator poles;
at least one winding wound around the stator core;
connecting terminals configured to connect with an external power source to supply power to the at least one winding and located at one end of the yoke adjacent the stator poles;
a winding bracket between the stator core and the at least one winding, the connecting terminals being fixed to the winding bracket; and
an electronic circuit and a connecting member disposed on the winding bracket, the connecting member being separately formed and electrically connected to the at least one winding with the electronic circuit,
wherein the electronic circuit comprises a magnetic sensor disposed adjacent the connecting terminals and between the connecting terminals and the connecting member.

11. A stator comprising:
a stator core including stator poles and a yoke connecting the stator poles;
at least one winding wound around the stator core;
connecting terminals configured to connect with an external power source to supply power to the at least one winding and located at one end of the yoke adjacent the stator poles;
a winding bracket between the stator core and the at least one winding, the connecting terminals being fixed to the winding bracket; and
an electronic circuit and a connecting member disposed on the winding bracket, the connecting member being separately formed and electrically connected to the at least one winding with the electronic circuit,
wherein a number of the connecting terminals is two, the electronic circuit and the at least one winding are in series connected between the two connecting terminals, one of the two connecting terminals being electrically connected with the electronic circuit and both ends of the at least one winding being electrically connected with the connecting member and the other one of the two connecting terminals respectively.

12. The stator of claim 11, wherein a number of the stator poles is two, the yoke is in a U-shaped form and the winding bracket comprises a first bracket and a second bracket arranged in parallel with each other, the first bracket or the second bracket having a winding portion and an inserting portion disposed at one end of the winding portion, bottoms of the connecting terminals being inserted into the inserting portion.

13. The stator of claim 11, wherein the connecting member, the connecting terminals and the electronic circuit are all disposed on the winding bracket and located at one end of the yoke adjacent the stator pole.

14. The stator of claim 11, wherein the electronic circuit comprises a magnetic sensor disposed adjacent the connecting terminals and between the connecting terminals and the connecting member.

15. A single phase motor comprising:
a rotor and the stator of claim 11 magnetically coupled to the rotor.

16. A ventilation fan comprising:
an impeller; and
a single phase motor for driving the impeller which comprising a rotor and the stator of claim 11.

* * * * *